United States Patent
Endou et al.

(10) Patent No.: US 10,947,978 B2
(45) Date of Patent: Mar. 16, 2021

(54) COMPRESSOR AND VALVE ASSEMBLY

(71) Applicant: DAIKIN INDUSTRIES, LTD., Osaka (JP)

(72) Inventors: Chihiro Endou, Osaka (JP); Masanori Masuda, Osaka (JP); Yukihiro Inada, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/310,699

(22) PCT Filed: May 10, 2017

(86) PCT No.: PCT/JP2017/017749
§ 371 (c)(1),
(2) Date: Dec. 17, 2018

(87) PCT Pub. No.: WO2017/221571
PCT Pub. Date: Dec. 28, 2017

(65) Prior Publication Data
US 2019/0242385 A1    Aug. 8, 2019

(30) Foreign Application Priority Data
Jun. 22, 2016 (JP) .............................. JP2016-123421

(51) Int. Cl.
*F04C 29/12* (2006.01)
*F04C 18/356* (2006.01)
(Continued)

(52) U.S. Cl.
CPC .......... *F04C 29/124* (2013.01); *F04C 18/356* (2013.01); *F04C 29/00* (2013.01);
(Continued)

(58) Field of Classification Search
CPC ........ F04C 18/356; F04C 29/00; F04C 29/04; F04C 29/042; F04C 29/0007;
(Continued)

(56) References Cited

U.S. PATENT DOCUMENTS 5,722,257 A    3/1998  Ishii et al.
5,971,016 A *  10/1999 Wass ................... F16K 17/0413
                                                  137/541
(Continued)

FOREIGN PATENT DOCUMENTS

CN     103423163 A    12/2013
JP       3-37391 A     2/1991
(Continued)

OTHER PUBLICATIONS

International Preliminary Report of corresponding PCT Application No. PCT/JP2017/017749 dated Jan. 3, 2019.
(Continued)

*Primary Examiner* — Philip E Stimpert
(74) *Attorney, Agent, or Firm* — Global IP Counselors, LLP

(57) ABSTRACT

A compressor includes a compression mechanism that compresses low-pressure refrigerant in a compression chamber into high-pressure refrigerant, and an injection pipe arranged to supply intermediate-pressure refrigerant to the compression chamber. A valve assembly is disposable between the compression chamber and the injection pipe. The valve assembly includes an opening forming member that forms an opening, a valve body and a spring member. The valve body moves in accordance with differences between pressure of the refrigerant supplied from the injection pipe and pressure of the refrigerant in the middle of compression in the compression chamber. The valve body blocks the opening when the valve body has moved from a compression
(Continued)

chamber side to an injection pipe side. The spring member is disposed on the injection pipe side of the opening. The spring member applies force in a direction of the injection pipe to the valve body.

18 Claims, 27 Drawing Sheets

(51) Int. Cl.
   *F04C 29/00* (2006.01)
   *F04C 29/04* (2006.01)
   *F16K 15/06* (2006.01)
(52) U.S. Cl.
   CPC .......... *F04C 29/0007* (2013.01); *F04C 29/04* (2013.01); *F04C 2210/22* (2013.01); *F16K 15/063* (2013.01)
(58) Field of Classification Search
   CPC .. F04C 29/124; F04C 18/324; F04C 2210/22; F04C 2210/221; F04C 2210/226; F16K 15/063
   See application file for complete search history.

(56) References Cited

U.S. PATENT DOCUMENTS

| | | | |
|---|---|---|---|
| 6,202,438 B1 | 3/2001 | Barito | |
| 2014/0347867 A1* | 11/2014 | Chapman | ................ F16K 17/04 |
| | | | 362/362 |
| 2014/0348677 A1* | 11/2014 | Moeller | .............. F04B 53/1027 |
| | | | 417/559 |
| 2015/0040608 A1* | 2/2015 | Nam | ..................... F04C 2/3564 |
| | | | 62/498 |

FOREIGN PATENT DOCUMENTS

| | | |
|---|---|---|
| JP | 9-133088 A | 5/1997 |
| JP | 2012-57568 A | 3/2012 |
| JP | 2013-36442 A | 2/2013 |

OTHER PUBLICATIONS

European Search Report of corresponding EP Application No. 17 81 5041.3 dated May 3, 2019.
International Search Report of corresponding PCT Application No. PCT/JP2017/017749 dated Jul. 18, 2017.

* cited by examiner

COMPRESSOR AND VALVE ASSEMBLY

CROSS-REFERENCE TO RELATED APPLICATIONS

This U.S. National stage application claims priority under 35 U.S.C. § 119(a) to Japanese Patent Application No. 2016-123421, filed in Japan on Jun. 22, 2016, the entire contents of which are hereby incorporated herein by reference.

TECHNICAL FIELD

The present invention relates to a compressor and a valve assembly.

BACKGROUND ART

Compressors that carry out intermediate-pressure refrigerant injection have become common in recent years. Ordinarily, in the type of compressor that carries out intermediate-pressure refrigerant injection, a check valve is provided in an injection passage between an injection pipe and a compression mechanism (e.g., Chinese Patent Application Publication No. 103,423,163 specification).

SUMMARY

However, in the type of compressor described above, when the check valve is closed, compressed refrigerant accumulates in a space in the injection passage on a compression chamber side of the check valve. Additionally, sometimes this compressed refrigerant backflows to a low-pressure-side compression chamber, thereby causing re-expansion and re-compression and lowering the compression efficiency of the compressor.

It is a problem of the present invention to provide a compressor whose compression efficiency is high.

A valve assembly pertaining to a first aspect of the invention is used in a compressor having a compression mechanism that compresses low-pressure refrigerant in a compression chamber into high-pressure refrigerant and an injection pipe for supplying intermediate-pressure refrigerant to the compression chamber. Furthermore, the valve assembly is provided between the compression chamber and the injection pipe. Here, the valve assembly has an opening forming member, a valve body, and a spring member. The opening forming member forms an opening. The valve body moves in accordance with differences between the pressure of the refrigerant supplied from the injection pipe and the pressure of the refrigerant in the middle of compression in the compression chamber and blocks the opening when the valve body has moved from the compression chamber side to the injection pipe side. The spring member is disposed on the injection pipe side of the opening and applies force in the direction of the injection pipe to the valve body.

In the valve assembly pertaining to the first aspect, the spring member disposed on the injection pipe side of the opening is used to block the opening, so the dead volume of the injection passage between the opening and the compression chamber can be reduced. Because of this, accumulation of the compressed refrigerant in the space between the open portion in the injection passage and the compression chamber can be reduced. As a result, backflow of the compressed refrigerant to the low-pressure-side compression chamber can be reduced, and a compressor whose compression efficiency is high can be provided.

A valve assembly pertaining to a second aspect of the invention is the valve assembly pertaining to the first aspect, wherein the valve assembly further has, on the injection pipe side of the opening, a movable member that is coupled to the valve body.

Here, the spring member is a compression spring. Furthermore, the movable member receives a compression spring load from the spring member.

In the valve assembly pertaining to the second aspect, the compression spring can be used to move the valve body.

A valve assembly pertaining to a third aspect of the invention is the valve assembly pertaining to the second aspect, wherein the opening forming member further has a retention portion that surrounds and retains the periphery of the spring member.

In the valve assembly pertaining to the third aspect, the spring member is retained by the opening forming member, so the valve assembly in which detachment of the spring member is deterred and which has an integrated configuration can be provided.

A valve assembly pertaining to a fourth aspect of the invention is the valve assembly pertaining to the third aspect, wherein the retention portion has a contact portion that engages with the movable member and regulates movement of the movable member.

In the valve assembly pertaining to the fourth aspect, the retention portion regulates the movement of the movable member, so a situation where the valve body is moved more than necessary by the spring member can be avoided. Specifically, a situation where the valve body pops out into the compression chamber from the injection pipe can be avoided.

A valve assembly pertaining to a fifth aspect of the invention is the valve assembly of the second aspect, wherein the opening forming member further has a tubular portion. The tubular portion communicates with the opening, and the valve body is inserted inside the tubular portion. Furthermore, the spring member is disposed surrounding the periphery of the tubular portion.

In the valve assembly pertaining to the fifth aspect, because of the above-described configuration, a valve assembly in which detachment of the spring member is deterred and whose members are integrated can be provided.

A valve assembly pertaining to a sixth aspect of the invention is the valve assembly of the fifth aspect, wherein the tubular portion has a contact portion that contacts the movable member and regulates movement of the movable member.

In the valve assembly pertaining to the sixth aspect, the tubular portion regulates the movement of the movable member, so a situation where the valve body is moved more than necessary by the spring member can be avoided. Specifically, a situation where the valve body pops out into the compression chamber from the injection pipe can be avoided.

A valve assembly pertaining to a seventh aspect of the invention is the valve assembly of the sixth aspect, wherein the contact portion is disposed on the injection pipe side of the opening in the opening forming member.

In the valve assembly pertaining to the seventh aspect, because of the above-described configuration, a valve assembly disposed on the injection pipe side can be provided.

A valve assembly pertaining to an eighth aspect of the invention is the valve assembly of any of the second aspect to the seventh aspect, wherein the movable member has flow path openings.

In the valve assembly pertaining to the eighth aspect, the movable member has the flow path openings, so the intermediate-pressure refrigerant flowing in from the injection pipe can be supplied through the inside of the valve assembly to the compression chamber.

A valve assembly pertaining to a ninth aspect of the invention is the valve assembly of the first aspect, wherein the spring member is an extension spring that is coupled to the valve body from the injection pipe side of the opening.

In the valve assembly pertaining to the ninth aspect, the extension spring can be used to move the valve body.

A compressor pertaining to a tenth aspect of the invention has the valve assembly of any of the first aspect to the ninth aspect. Here, the compression mechanism has an injection passage out of which the intermediate-pressure refrigerant flows to the compression chamber and a housing portion that houses the valve assembly. Additionally, the housing portion houses the valve assembly in such a way that an outflow direction of the intermediate-pressure refrigerant that flows out of the opening and an outflow direction of the intermediate-pressure refrigerant that flows out from the injection passage to the compression chamber are substantially horizontal.

In the valve assembly pertaining to the tenth aspect, the intermediate-pressure refrigerant flows linearly from the injection pipe to the compression chamber, so the intermediate-pressure refrigerant can be supplied quickly when the opening is open. Furthermore, the injection passage can be formed linearly, so the manufacture of the compressor can be simplified.

A compressor pertaining to an eleventh aspect of the invention has the valve assembly of any of the first aspect to the ninth aspect. Here, the compression mechanism has an injection passage out of which the intermediate-pressure refrigerant flows to the compression chamber and a housing portion that houses the valve assembly. Additionally, the housing portion houses the valve assembly in such a way that an outflow direction of the intermediate-pressure refrigerant that flows out of the opening and an outflow direction of the intermediate-pressure refrigerant that flows out from the injection passage to the compression chamber are substantially perpendicular.

In the valve assembly pertaining to the eleventh aspect, the opening can be disposed in a direction orthogonal to the compression chamber. As a result, the flow of the intermediate-pressure refrigerant bends, so the opening can be opened gently with respect to pressure changes in the compression chamber. Furthermore, the opening forming member and the cylinder can be integrated, and the number of parts can be reduced.

In a compressor pertaining to a twelfth aspect of the invention, the compressor of the first aspect to the eleventh aspect is a rotary compressor.

In the valve assembly pertaining to the twelfth aspect, a rotary compressor whose compression efficiency is high can be provided.

A rotary compressor pertaining to a thirteenth aspect of the invention is the rotary compressor of the twelfth aspect, wherein the compression mechanism has a cylinder and a piston. The piston forms the compression chamber between itself and an inner peripheral surface of the cylinder and eccentrically rotates along the inner peripheral surface of the cylinder. Furthermore, the opening forming member is housed in the cylinder. Additionally, at least part of the valve body projects into the compression chamber from the cylinder when the valve body is not blocking the opening. It will be noted that the opening forming member may also be a member integrated with the cylinder.

In the rotary compressor pertaining to the thirteenth aspect, because of the above-described configuration, the dead volume between the valve assembly and the compression chamber can be reduced, so compression efficiency can be further raised.

A rotary compressor pertaining to a fourteenth aspect of the invention is the rotary compressor of the thirteenth aspect, wherein the valve body has, on the compression chamber side of the opening in the opening forming member, a flat plate-shaped flat plate portion. Here, a central portion of the flat plate portion projects into the compression chamber. Of end portions of the flat plate portion, the end portion on the side opposing the rotational movement of the piston does not project into the compression chamber.

In the rotary compressor pertaining to the fourteenth aspect, because of the above-described configuration, even in a case where the valve body does not move normally, damage to the valve body caused by the rotation of the piston can be avoided. As a result, a rotary compressor that is highly safe can be provided.

A rotary compressor pertaining to a fifteenth aspect of the invention is the rotary compressor of the thirteenth aspect, wherein the valve body has, on the compression chamber side of the opening in the opening forming member, a flat plate-shaped flat plate portion. Here, a central portion of the flat plate portion projects into the compression chamber. Both end portions of the flat plate portion do not project into the compression chamber.

In the rotary compressor pertaining to the fifteenth aspect, because of the above-described configuration, even in a case where, for example, the piston reversely rotates, damage to the valve body caused by the rotation of the piston can be avoided. As a result, a rotary compressor that is highly safe can be provided.

In the valve assembly pertaining to the first aspect, the dead volume of the injection passage between the opening and the compression chamber can be reduced. As a result, a compressor whose compression efficiency is high can be provided.

In the valve assembly pertaining to the second aspect, the compression spring can be used to move the valve body.

In the valve assembly pertaining to the third aspect, a valve assembly in which detachment of the spring member is deterred and which has an integrated configuration can be provided.

In the valve assembly pertaining to the fourth aspect, a situation where the valve body is moved more than necessary by the spring member can be avoided.

In the valve assembly pertaining to the fifth aspect, a valve assembly in which detachment of the spring member is deterred and whose members are integrated can be provided.

In the valve assembly pertaining to the sixth aspect, a situation where the valve body is moved more than necessary by the spring member can be avoided.

In the valve assembly pertaining to the seventh aspect, a valve assembly disposed on the injection pipe side can be provided.

In the valve assembly pertaining to the eighth aspect, the intermediate-pressure refrigerant flowing in from the injection pipe can be supplied through the inside of the valve assembly to the compression chamber.

In the valve assembly pertaining to the ninth aspect, the extension spring can be used to move the valve body.

In the valve assembly pertaining to the tenth aspect, the intermediate-pressure refrigerant flows linearly from the injection pipe to the compression chamber, so the intermediate-pressure refrigerant can be supplied quickly when the opening is open.

In the valve assembly pertaining to the eleventh aspect, the number of parts is reduced by disposing the opening in a direction orthogonal to the compression chamber.

In the valve assembly pertaining to the twelfth aspect, a rotary compressor whose compression efficiency is high can be provided.

In the rotary compressor pertaining to the thirteenth aspect, compression efficiency can be further raised.

In the rotary compressor pertaining to the fourteenth aspect, a rotary compressor that is highly safe can be provided.

In the rotary compressor pertaining to the fifteenth aspect, a rotary compressor that is highly safe can be provided.

BRIEF DESCRIPTION OF DRAWINGS

FIG. 11 depicts a state in which the piston 61 is disposed at top dead center (=a state in which the angle of rotation of the piston is 0 degrees).

FIG. 12 depicts a state in which the angle of rotation of the piston is 90 degrees.

FIG. 13 depicts a state in which the angle of rotation of the piston is 180 degrees.

FIG. 14 depicts a state in which the angle of rotation of the piston is 270 degrees.

(FIG. 15 is a schematic view showing a common check valve structure.)

DETAILED DESCRIPTION OF EMBODIMENTS

First Embodiment

A compressor 100 pertaining to a first embodiment of the invention will be described with reference to the drawings. It will be noted that in the following embodiment the compressor 100 will be described using a rotary compressor as an example, but the compressor type can be appropriately changed in a range that does not depart from the spirit of the invention.

(1) Overview of Air Conditioning System in which Rotary Compressor is Used

Figure 1:
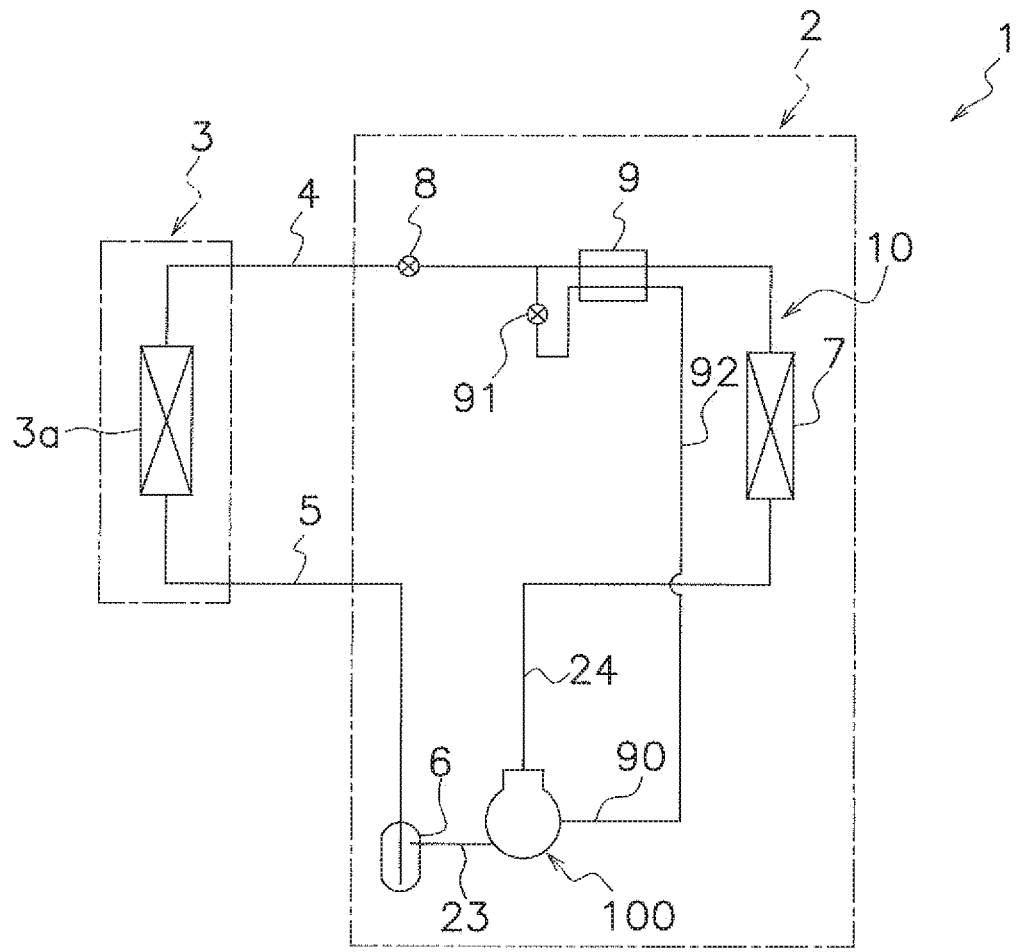
FIG. 1 is an overview diagram of an air conditioning system 1 in which a rotary compressor 100 pertaining to a first embodiment of the invention is used.

FIG. 1 is an overview diagram of an air conditioning system 1 in which the rotary compressor 100 pertaining to the first embodiment of the invention is used. Here, a cooling operation-only air conditioning system is shown, but the air conditioning system in which the rotary compressor 100 is employed may also be a heating operation-only air conditioning system or an air conditioning system capable of carrying out both a cooling operation and a heating operation.

The air conditioning system 1 mainly has an outdoor unit 2 that mainly has the rotary compressor 100, an indoor unit 3, and a liquid refrigerant communication pipe 4 and a gas refrigerant communication pipe 5 that interconnect the outdoor unit 2 and the indoor unit 3. As shown in FIG. 1, the indoor unit 3 mainly has an indoor heat exchanger 3a. The outdoor unit 2 mainly has an accumulator 6, the rotary compressor 100, an outdoor heat exchanger 7, an expansion valve 8, an economizer heat exchanger 9, and an injection valve 91. These devices are interconnected by refrigerant pipes as shown in FIG. 1.

The rotary compressor 100 compresses, in a later-described compression chamber C1, refrigerant sucked in via a suction pipe 23 and discharges the refrigerant after compression from a discharge pipe 24. Furthermore, in the rotary compressor 100, what is called intermediate injection, in which some of the refrigerant flowing from the outdoor heat exchanger 7 toward the expansion valve 8 is supplied to the compression chamber C1 in the middle of compression, is performed.

(2) Overall Configuration of Rotary Compressor

Figure 2:
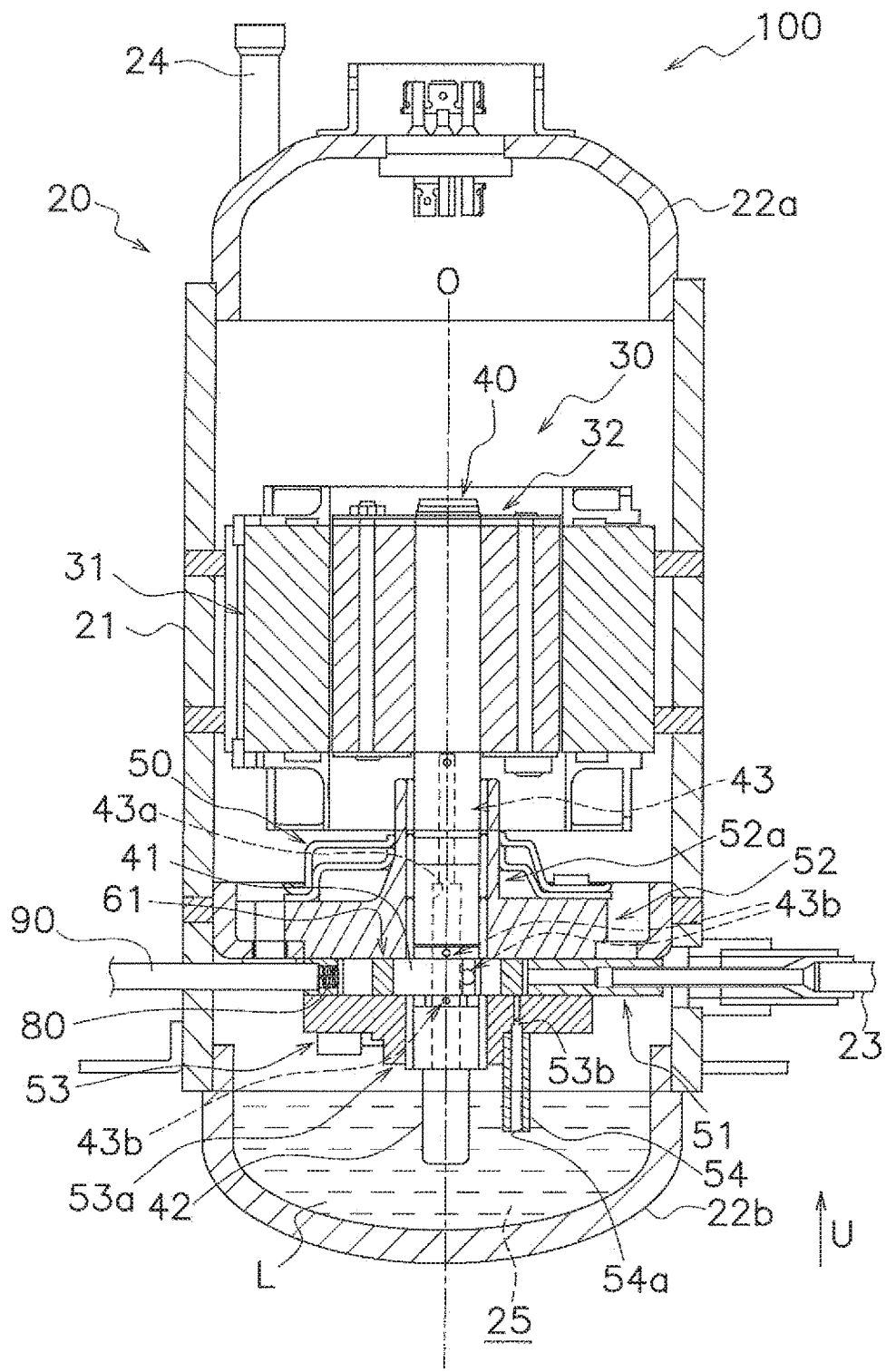
FIG. 2 is a longitudinal sectional view schematically showing the rotary compressor 100 pertaining to the same embodiment.

FIG. 2 is a longitudinal sectional view schematically showing the rotary compressor 100 pertaining to the first embodiment. In the following description, expressions such as "upper" and "lower" are sometimes used to indicate positional relationships and directions in the rotary compressor 100, and unless otherwise specified the direction of arrow U in FIG. 2 indicates an upward direction.

It will be noted that FIG. 2 shows a sectional view in different directions on the right side and the left side from the center. Namely, in FIG. 2, a valve assembly 80 and an injection pipe 90 are shown in positions opposing the suction pipe 23, but in reality the valve assembly 80 and the injection pipe 90 are disposed in positions in which the efficiency of intermediate-pressure refrigerant injection is optimized.

The rotary compressor 100 is a device that sucks in and compresses low-pressure refrigerant from the suction pipe 23 and discharges high-pressure refrigerant from the discharge pipe 24. Furthermore, intermediate-pressure refrigerant is supplied to the rotary compressor 100 from the injection pipe 90. In the rotary compressor 100, R32, for example, is used as the refrigerant. However, the refrigerant type is not limited to this.

The rotary compressor 100 is, as shown in FIG. 2 for example, a single cylinder-type rotary compressor. The rotary compressor 100 mainly has a casing 20, a motor 30, a drive shaft 40, and a compression mechanism 50. The motor 30, the drive shaft 40, and the compression mechanism 50 are housed in the casing 20. Inside the casing 20, the motor 30 is disposed in the vicinity of the up and down direction central portion of the casing 20, and the compression mechanism 50 is disposed thereunder.

(3) Detailed Configuration (3-1) Casing

The casing 20 is a vertical open cylinder-shaped vessel. The casing 20 has an open cylinder member 21, which is shaped like an open cylinder whose top and bottom are open, and an upper cap 22a and a lower cap 22b, which are shaped like bowls, are provided on the upper end and the lower end, respectively, of the open cylinder member 21, and close the upper and lower open ends of the open cylinder member 21 (see FIG. 2). The upper cap 22a and the lower cap 22b are secured by welding to the open cylinder member 21 so as to be airtight.

The suction pipe 23 is provided in the lower portion of the open cylinder member 21. The suction pipe 23 is coupled to the compression mechanism 50 and supplies low-pressure refrigerant in a refrigerant circuit 10 to the compression chamber C1 of the compression mechanism 50. Furthermore, the injection pipe 90 is provided in the lower portion of the open cylinder member 21. The injection pipe 90 is coupled to the compression mechanism 50 and supplies intermediate-pressure refrigerant in the refrigerant circuit 10 to the compression chamber C1 of the compression mechanism 50. Furthermore, the injection pipe 90 is connected to an injection refrigerant supply pipe 92. The discharge pipe 24 is provided in the upper portion of the open cylinder member 21. The discharge pipe 24 discharges high-pressure refrigerant compressed by the compression mechanism 50 to the refrigerant circuit 10 not shown in the drawings.

An oil reservoir 25 is formed in the lower portion of the casing 20. Refrigerating machine oil L for lubricating the compression mechanism 50 and so forth is stored in the oil reservoir 25.

(3-2) Motor

The motor 30 is a mechanism that drives the compression mechanism 50. As shown in FIG. 2, the motor 30 is housed in the up and down direction central portion of the casing 20. The motor 30 is disposed above the compression mechanism 50. The motor 30 mainly has a stator 31 and a rotor 32.

The stator 31 is formed in an annular shape. The outer peripheral surface of the stator 31 is secured by spot welding to the inner surface of the open cylinder member 21. However, the method securing the stator 31 to the open cylinder member 21 is exemplary and is not limited to this.

The rotor 32 is an open cylinder-shaped member. The rotor 32 is disposed a slight distance away from the stator 31 on the inside of the stator 31 that is formed in the annular shape. The drive shaft 40 is insertingly fitted into the hollow portion of the rotor 32. The rotor 32 rotates when it is subjected to magnetic force generated by current flowing through a coil (not shown in the drawings) wound around the stator 31. When the rotor 32 rotates, the drive shaft 40 rotates and drive force is imparted via the drive shaft 40 from the motor 30 to the compression mechanism 50.

(3-3) Drive Shaft

The drive shaft 40 intercouples the compression mechanism 50 and the motor 30. The drive shaft 40 is a member that extends in the up and down direction inside the casing 20. Additionally, the upper portion of the drive shaft 40 is coupled to the rotor 32 of the motor 30. Furthermore, the lower portion of the drive shaft 40 is coupled to the compression mechanism 50.

Here, the drive shaft 40 has an eccentric portion 41 that is eccentric with respect to an axial center O of the drive shaft 40. Additionally, the eccentric portion 41 is coupled to a later-described piston 61. It will be noted that the piston 61 is disposed in a space surrounded by a cylinder hole 51d in a cylinder 51 of the compression mechanism 50. The eccentric portion 41 is fitted inside the open cylinder-shaped piston 61 in a state in which the eccentric portion 41 is capable of transmitting the force of the motor 30.

The drive shaft 40 is rotatably supported by an upper bearing portion 52a of a front head 52 and a lower bearing portion 53a of a rear head 53 of the later-described compression mechanism 50. The drive shaft 40 rotates about the axial center O when the motor 30 is driven. Additionally, the eccentric portion 41 rotates eccentrically with respect to, and causes the piston 61 of the compression mechanism 50 to revolve around, the axial center O.

An oil pump 42 for sucking the refrigerating machine oil L in the oil reservoir 25 is secured to the lower end portion of the drive shaft 40. An oil supply passage 43 through which flows the refrigerating machine oil L sucked by the oil pump 42 is formed inside the drive shaft 40 (see FIG. 2). The oil supply passage 43 has a primary oil supply passage 43a that extends in the up and down direction along the drive shaft 40. Furthermore, the oil supply passage 43 has plural secondary oil supply passages (not shown in the drawings) that extend outward in the radial direction of the drive shaft 40 from the primary oil supply passage 43a. The secondary oil supply passages open to the vicinity of the lower end of the upper bearing portion 52a, the vicinity of the upper end of the lower bearing portion 53a, and the side surface of the drive shaft 40 at the eccentric portion 41 to form plural oil supply ports 43b. The refrigerating machine oil L sucked by the oil pump 42 from the oil reservoir 25 passes through the primary oil supply passage 43a and the secondary oil supply passages and is supplied from the oil supply ports 43b to sliding portions of the drive shaft 40 and the piston 61.

(3-4) Compression Mechanism

The compression mechanism 50 is an example of a refrigerant compression mechanism. The compression mechanism 50 is a mechanism that compresses refrigerant sucked in via the suction pipe 23. The compression mechanism 50 is disposed under the motor 30 as shown in FIG. 1. The compression mechanism 50 mainly has the cylinder 51, the front head 52, the rear head 53, the piston 61, a blade 62, and bushes 63. The piston 61 and the blade 62 are integrally formed. The blade 62 extends from an outer peripheral surface 61a of the open cylinder-shaped piston 61.

(3-4-1) Cylinder

Figure 3:
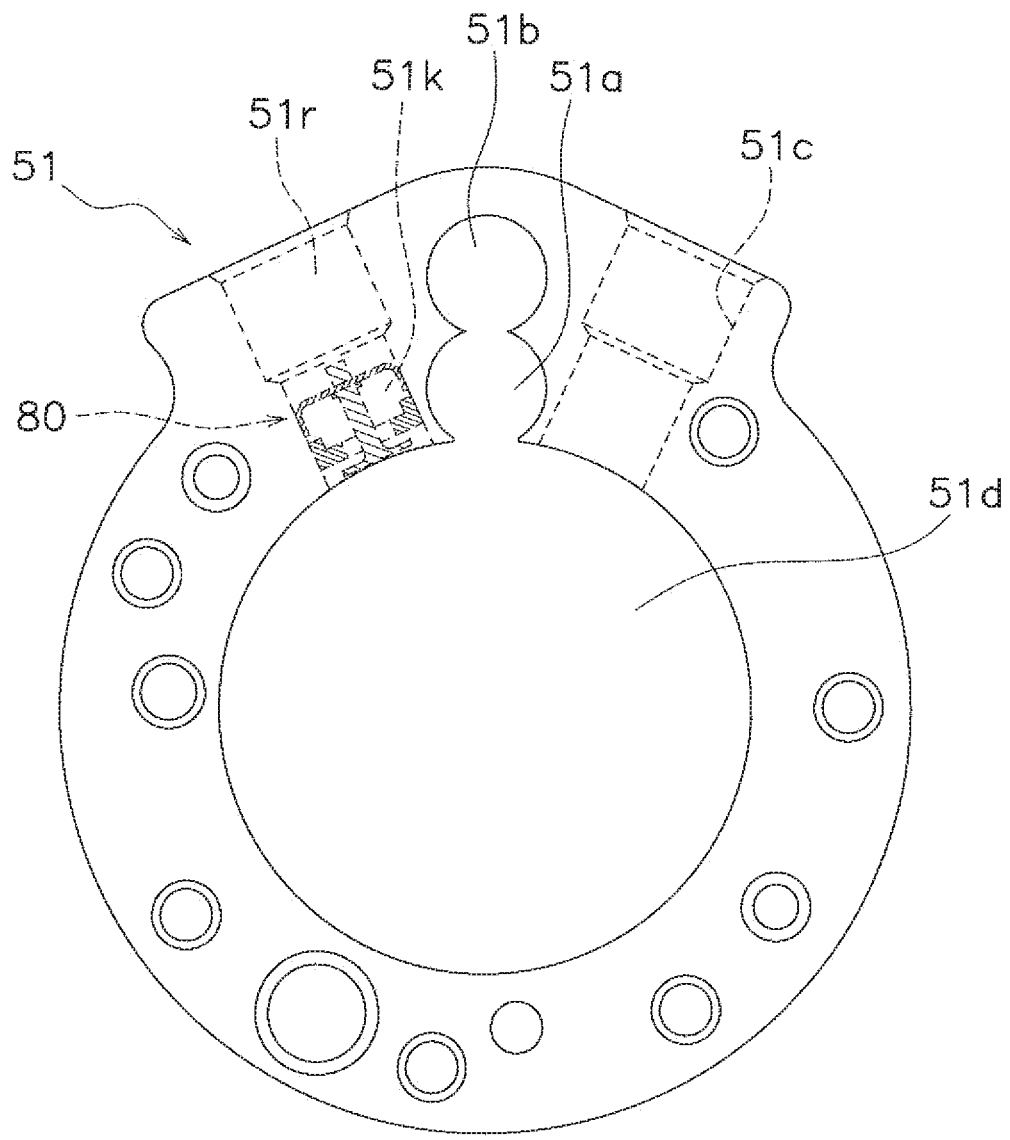
FIG. 3 is a plan view schematically showing the configuration of a cylinder 51 pertaining to the same embodiment.
Figure 4:
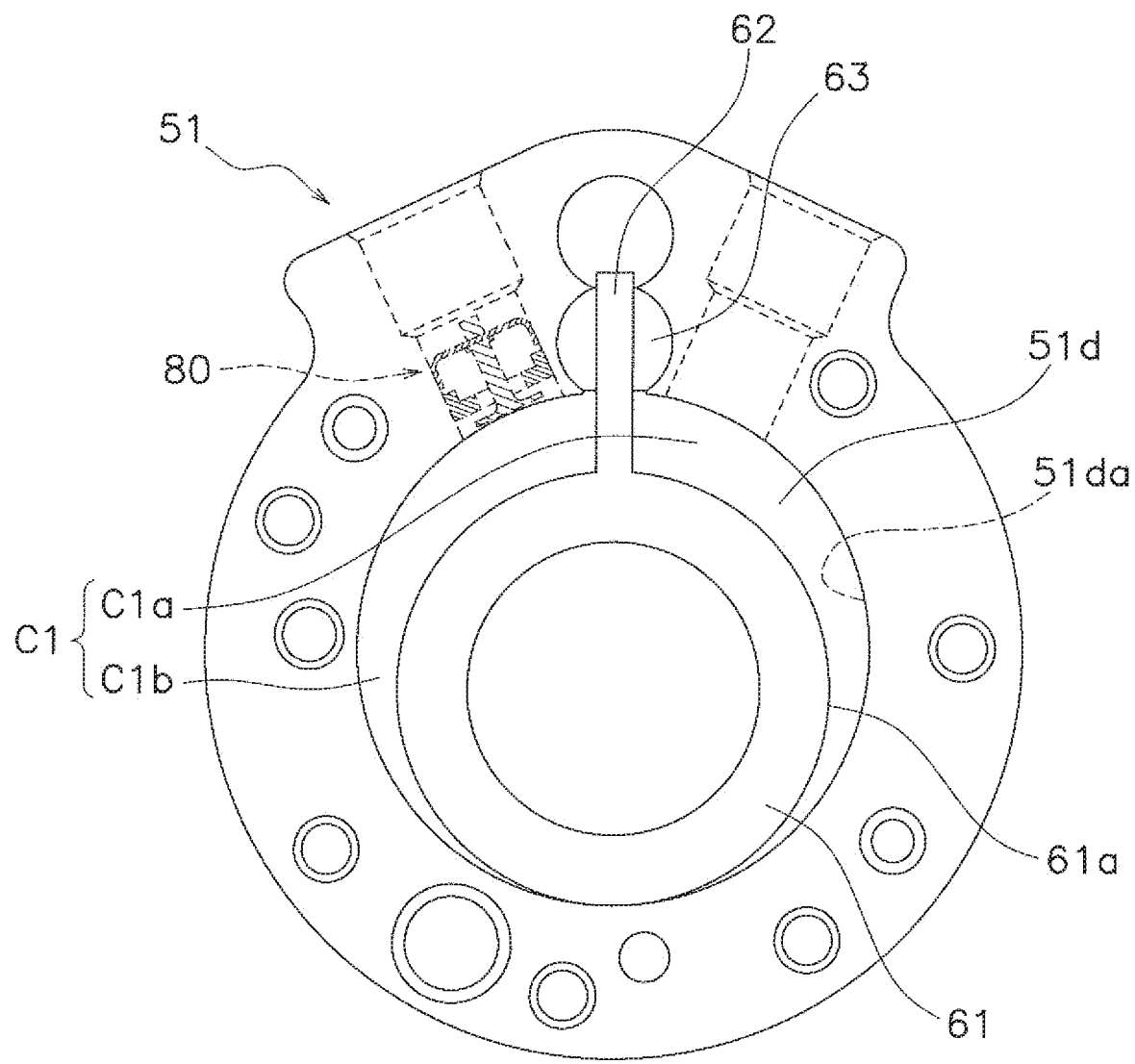
FIG. 4 is a view showing a state in which a piston 61 is housed in the cylinder 51 pertaining to the same embodiment.

FIG. 3 is a plan view schematically showing the configuration of the cylinder 51. The cylinder 51 is disposed inside the casing 20 in such a way that its axial direction extends in the up and down direction. Both upper and lower ends of the cylinder 51 are open, and the closed cylinder-shaped cylinder hole 51d (the hollow portion of the open cylinder-shaped cylinder 51) is formed inside the cylinder 51. As shown in FIG. 4, the piston 61 is housed in the cylinder hole 51d.

A bush retention hole 51a into which the bushes 63 are rotatably inserted and an oil supply hole 51b that communicates with the bush retention hole 51a are formed in the cylinder 51 on the outer peripheral side of the cylinder hole 51d. Furthermore, a suction passage 51c that communicates with the cylinder hole 51d is formed in the cylinder 51.

The blade 62 is disposed inside the bush retention hole 51a and the oil supply hole 51b. The blade 62 is swingably supported by the bushes 63 disposed in the bush retention hole 51a in accordance with the eccentric rotation of the later-described piston 61. The oil supply hole 51b communicates with the oil reservoir 25 via an oil supply communicating hole 53b, which is formed in the later-described rear head 53 that closes the lower opening in the cylinder 51, and a flow path 54a, which is formed inside an oil pickup 54 whose upper end is connected to the oil supply communicating hole 53b and whose lower end is disposed inside the oil reservoir 25. The refrigerating machine oil L in the oil reservoir 25 is sucked up by a pressure differential to the oil supply hole 51b and is utilized to lubricate sliding parts.

The suction passage 51c is formed through the cylinder 51 along the radial direction thereof from the outer peripheral surface of the cylinder 51 to the cylinder hole 51d. Because of this, the suction passage 51c communicates with the cylinder hole 51d. The distal end portion of the suction pipe 23 is inserted into the suction passage 51c. Additionally, the refrigerant is guided from the suction pipe 23 via the suction passage 51c to the compression chamber C formed inside the cylinder hole 51d.

Furthermore, an injection passage 51r that communicates with the compression chamber C and a housing portion 51k that houses the later-described valve assembly 80 are formed in the cylinder 51. Here, the injection passage 51r is formed extending in the horizontal direction through the cylinder 51. The injection pipe 90 is inserted into and secured to the injection passage 51r. Furthermore, the housing portion 51k is a space between the injection pipe 90 and the compression chamber C1, and refrigerant with an intermediate pressure (a pressure between a high pressure and a low pressure) flowing in from the injection pipe 90 is supplied through the housing portion 51k to the compression chamber C1.

(3-4-2) Front Head

The front head 52 is disposed above the cylinder 51. The front head 52 blocks the upper opening in the cylinder 51. Namely, the front head 52 blocks the upper opening of the cylinder hole 51d in the open cylinder-shaped cylinder 51. Additionally, the front head 52 forms a top surface of the compression chamber C1 that is formed between an inner peripheral surface 51da (a surface surrounding the cylinder hole 51d) of the cylinder 51 and the outer peripheral surface 61a of the piston 61 disposed inside the cylinder hole 51d. Furthermore, a discharge passage—not shown in the drawings—that communicates with the compression chamber C1 is formed in the front head 52, and the refrigerant compressed in the compression chamber C1 flows out from the compression chamber C through the discharge passage.

The open cylinder-shaped upper bearing portion 52a that rotatably supports the drive shaft 40 is formed in the upper portion of the front head 52.

(3-4-3) Rear Head

The rear head 53 is disposed under the cylinder 51 as shown in FIG. 2. The rear head 53 closes the lower opening in the cylinder 51. In other words, the rear head 53 blocks the lower opening of the cylinder hole 51d in the open cylinder-shaped cylinder 51. Additionally, the rear head 53 forms a bottom surface of the compression chamber C1 that is formed between the inner peripheral surface 51da of the cylinder 51 and the outer peripheral surface 61a of the piston 61 disposed inside the cylinder hole 51d.

The open cylinder-shaped lower bearing portion 53a that rotatably supports the drive shaft 40 is formed in the lower portion of the rear head 53.

The oil supply communicating hole 53b that communicates with the space surrounded by the oil supply hole 51b in the cylinder 51 is formed in the rear head 53. The oil supply communicating hole 53b runs through the rear head 53 in the up and down direction. The oil supply communicating hole 53b communicates with the flow path 54a formed inside the oil pickup 54 attached to the lower portion of the rear head 53. The lower end of the oil pickup 54 is disposed in the oil reservoir 25. The refrigerating machine oil L in the oil reservoir 25 is supplied by a pressure differential through the flow path 54a and the oil supply communicating hole 53b to the inside of the oil supply hole 51b.

(3-4-4) Piston

The piston 61 is a member formed in the shape of an open cylinder as shown in FIG. 4. The piston 61 is formed integrally with the blade 62. The eccentric portion 41 of the drive shaft 40 is fitted into the inside of the piston 61.

The piston 61 forms the compression chamber C1 together with the cylinder 51, the front head 52, and the rear head 53. The compression chamber C1 is a space surrounded by the outer peripheral surface 61a of the piston 61, the inner peripheral surface 51da of the cylinder 51, the lower surface of the front head 52, and the upper surface of the rear head 53. When the drive shaft 40 rotates, the piston 61 eccentrically rotates inside the cylinder hole 51d along the inner peripheral surface 51da of the cylinder 51 (revolves along the cylinder hole 51d in the cylinder 51). Additionally, the piston 61 compresses the refrigerant sucked into the compression chamber C1 via the suction passage 51c in the cylinder 51.

(3-4-5) Blade

The blade 62 is a member that partitions the compression chamber C1 into a low-pressure chamber C1a and a high-pressure chamber C1b. The blade 62 is a plate-shaped member formed integrally with the piston 61. The blade 62 is formed extending outward in the radial direction from the outer peripheral surface 61a of the open cylinder-shaped piston 61.

The blade 62 is sandwiched by the pair of bushes 63 disposed in the bush retention hole 51a in the cylinder 51 and is swingably supported by the bushes 63. Additionally, when the drive shaft 40 rotates, the blade 62 supported by the bushes 63 swings and goes in and out of the bush retention hole 51a and the oil supply hole 51b in accordance with the eccentric rotation of the piston 61. It will be noted that self-rotation of the piston 61 is regulated by the blade 62.

(3-4-6) Bushes

The compression mechanism 50 has a pair of the bushes 63. The bushes 63 are disposed in the bush retention hole 51a. Each bush 63 is a member with a semicylindrical shape (a shape obtained by dividing a closed cylinder in two along its axial direction). The pair of bushes 63 sandwich the blade 62 between themselves and swingably support the blade 62.

(3-4-7) Valve Assembly

Figure 5:
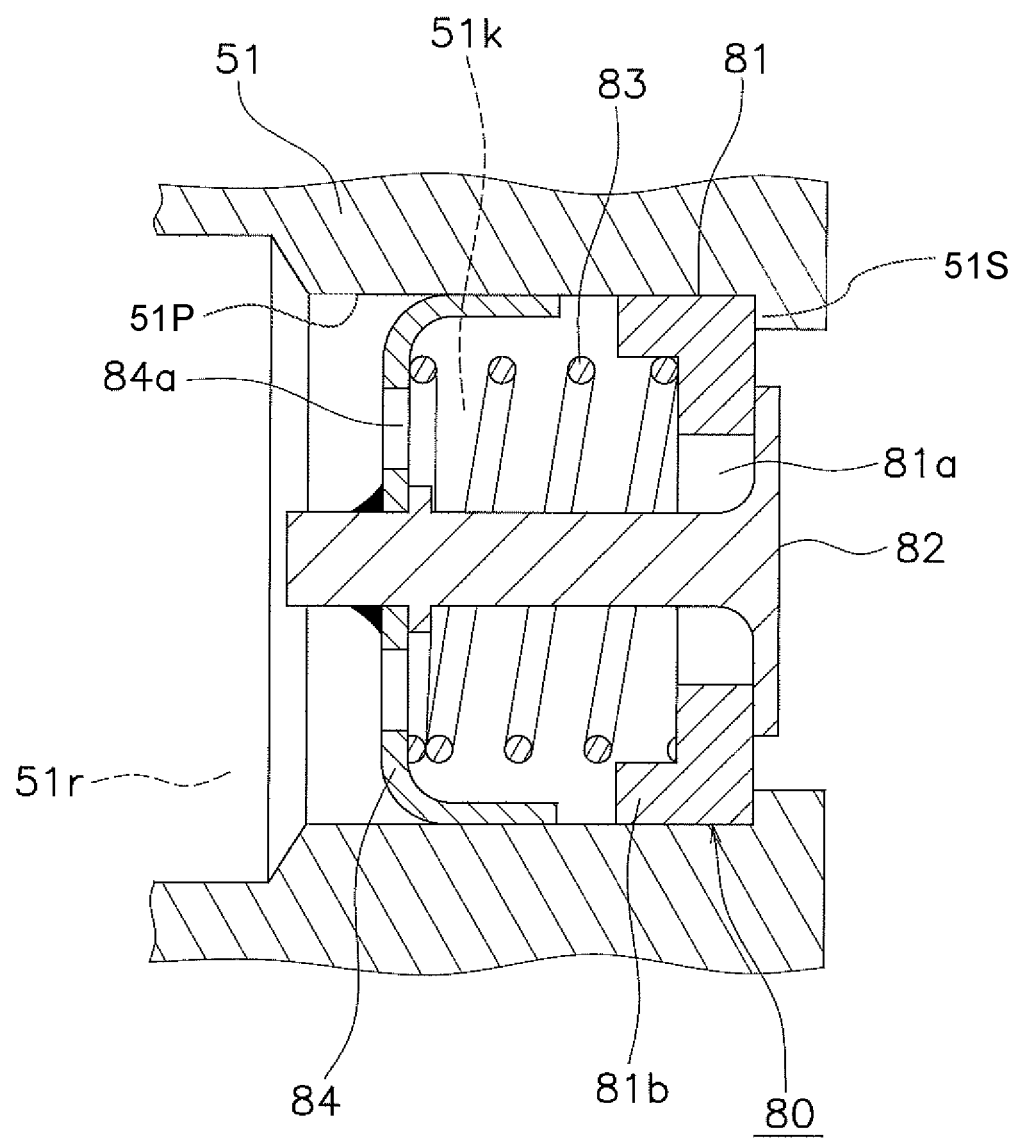
FIG. 5 is a view showing the configuration of a valve assembly 80 pertaining to the same embodiment.

The valve assembly 80 is provided between the compression chamber C1 and the injection pipe 90 and functions as a check valve. Specifically, as shown in FIG. 5, the valve assembly 80 has an opening forming member 81, a valve body 82, a spring member 83, and a spring receiving member (movable member) 84.

Figure 6:
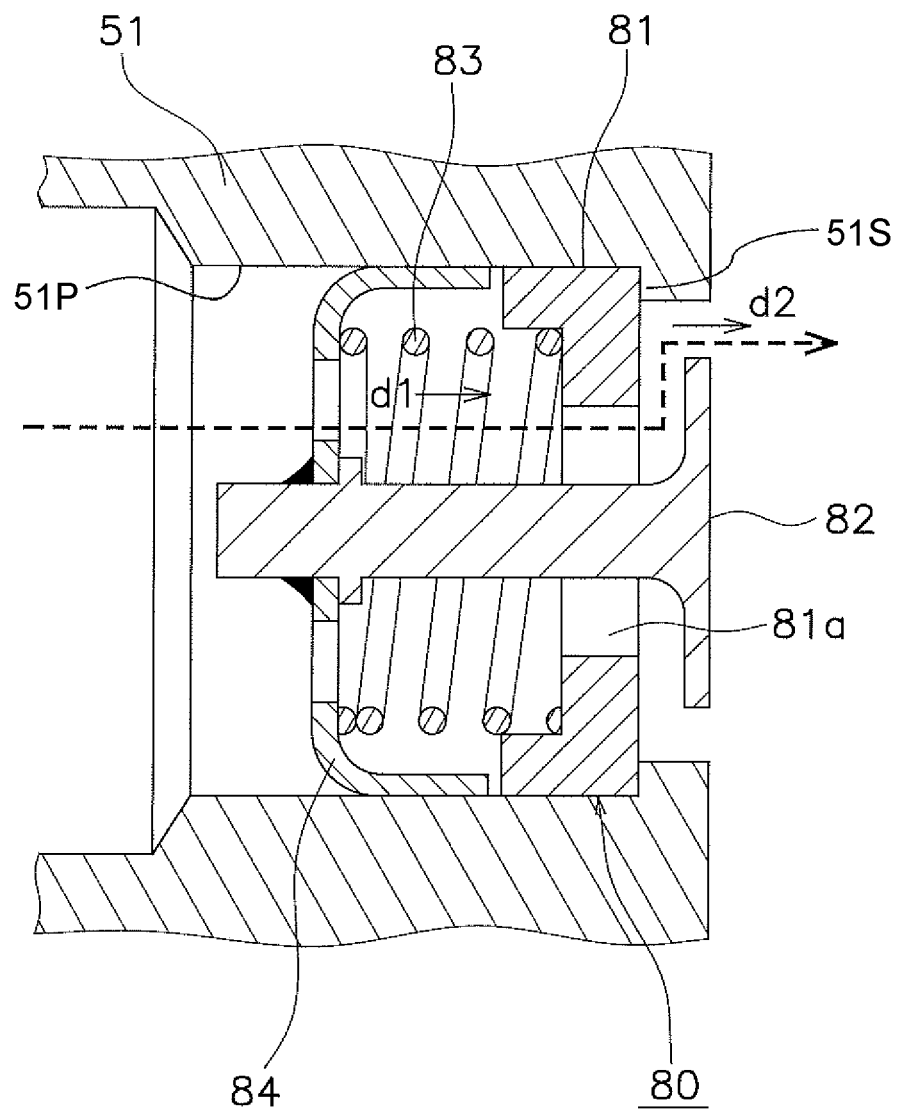
FIG. 6 is a schematic view for describing a housing position of the valve assembly 80 pertaining to the same embodiment.

It will be noted that in the present embodiment, as shown in FIG. 6, the valve assembly 80 is housed in the housing portion 51k in such a way that an outflow direction d1 of the intermediate-pressure refrigerant that flows out of an opening 81a and an outflow direction d2 of the intermediate-pressure refrigerant that flows out from the injection passage 51r to the compression chamber C1 are substantially horizontal. The housing portion 51k includes a flow path 51p in which the opening forming member 81 is disposed and a shoulder 51s against which the opening forming member 81 abuts. The shoulder 51s defines a dead volume of the injection passage between the opening 81a and the compression chamber C1.

Figure 7A:
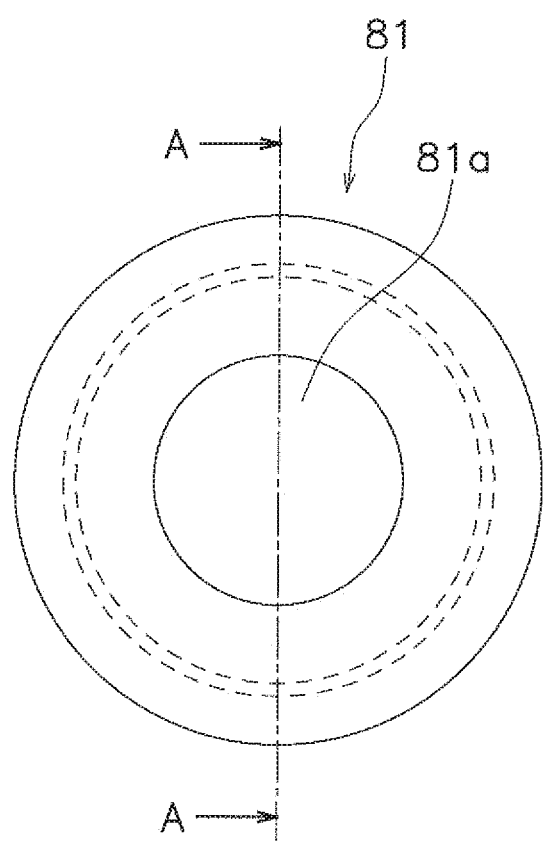
FIGS. 7A and 7B are schematic views showing configuration of an opening forming member 81 pertaining to the same embodiment.
Figure 7B:
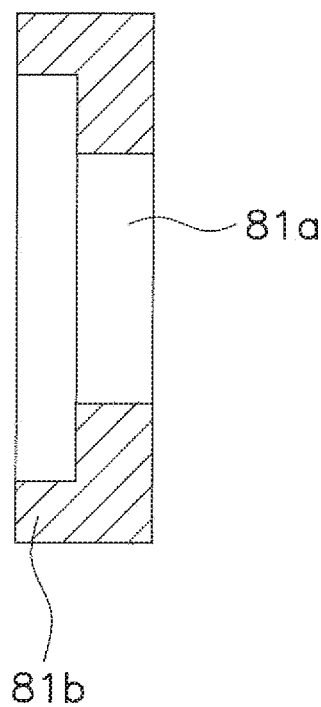

FIGS. 7A and B are schematic views showing the configuration of the opening forming member 81. FIG. 7A schematically shows a plan view of the opening forming member 81, and FIG. 7B schematically shows a sectional view along line A-A of FIG. 7A. As shown in FIG. 7A, the opening forming member 81 has a flat plate-shaped portion in which the opening 81a is formed. The opening 81a is closed by tight contact with a flat plate portion 82a of the later-described valve body 82. Furthermore, as shown in FIG. 7B, the opening forming member 81 has a retention portion 81b that surrounds and retains part of the periphery of the spring member 83. The retention portion 81b engages with the later-described spring receiving member 84 and regulates movement of the spring receiving member 84. The outer periphery of the opening forming member 81 is in tight contact with the housing portion 51k so when the opening 81a is closed, backflow of the refrigerant from the compression chamber C1 is checked.

Figures 8A, 8B:
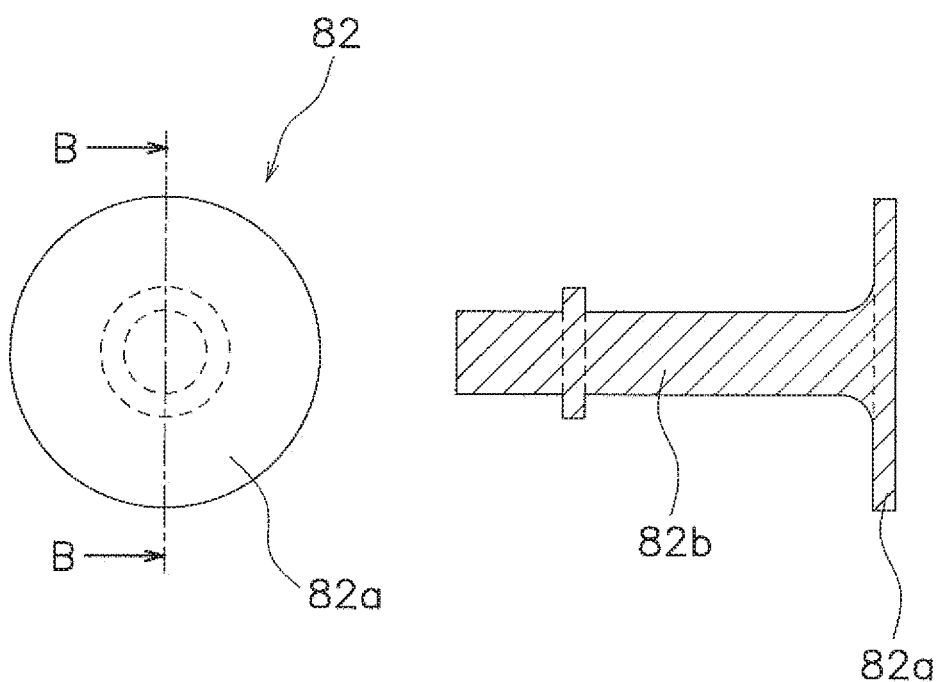
FIGS. 8A and 8B are schematic views showing the configuration of a valve body 82 pertaining to the same embodiment.

FIGS. 8A and 8B are schematic views showing the configuration of the valve body 82. FIG. 8A schematically shows a plan view of the valve body 82, and FIG. 8B shows a sectional view along line B-B of FIG. 8A. As shown in FIG. 8A, the valve body 82 has the flat plate-shaped flat plate portion 82a. Furthermore, as shown in FIG. 8B, the valve body 82 is provided with a rod-shaped valve shaft portion 82b on the central axis of the flat plate portion 82a. The valve shaft portion 82b runs through the opening 81a in the opening forming member 81 and is coupled to the spring receiving member 84. Because of this, the valve body 82 also moves in accordance with the movement of the spring receiving member 84. Specifically, the valve body 82 moves in accordance with differences between the pressure of the intermediate-pressure refrigerant supplied from the injection pipe 90 and the pressure of the refrigerant in the middle of compression inside the compression chamber C1. Additionally, the valve body 82 closes the opening 81a in the opening forming member 81 when the valve body 82 has moved from the compression chamber C1 side to the injection pipe 90 side.

The spring member 83 is disposed on the injection pipe 90 side of the opening 81a and applies force in the direction of the injection pipe 90 to the valve body 82. Here, as an example, a compression spring is employed as the spring member 83. As shown in FIG. 5, the spring member 83 is installed on the inside of the retention portion 81b of the opening forming member 81 and a retention portion 84c of the spring receiving member 84.

Figures 9A, 9B:
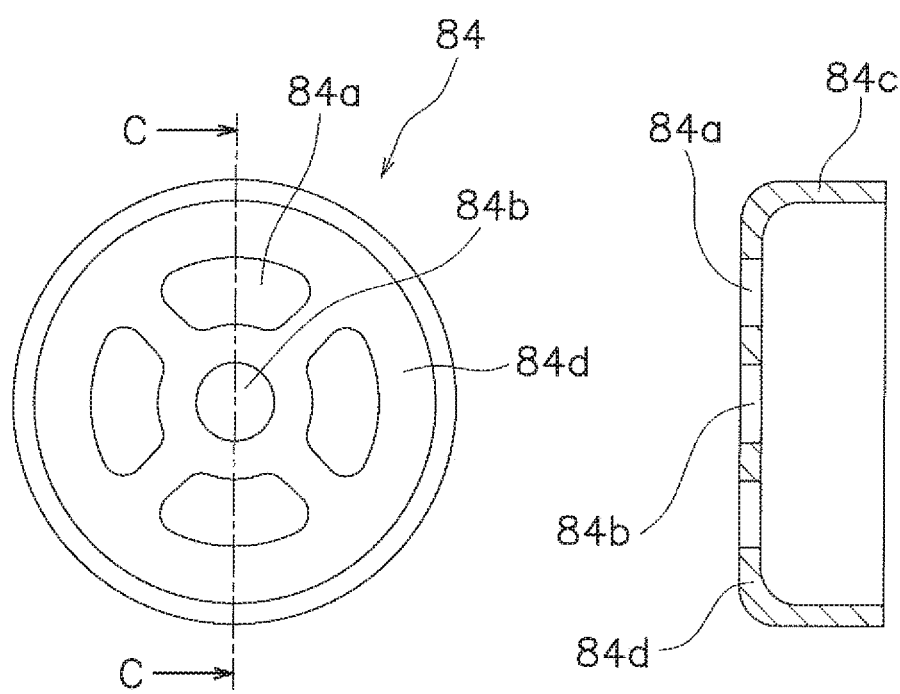
FIGS. 9A and 9B are schematic views showing the configuration of a spring receiving member 84 pertaining to the same embodiment.

FIGS. 9A and 9B are schematic views showing the configuration of the spring receiving member 84. FIG. 9A schematically shows a plan view of the spring receiving member 84, and FIG. 9B shows a sectional view along line C-C of FIG. 9A. As shown in FIG. 9A, the spring receiving member 84 has a flat plate-shaped bottom surface portion 84d. The bottom surface portion 84d is the portion that contacts the compression spring of the spring member 83, and the compression spring load is applied to the bottom surface portion 84d. Furthermore, the bottom surface portion 84d has flow path openings 84a and a coupling hole 84b. The valve shaft portion 82b of the valve body is inserted into and secured to the coupling hole 84b. Namely, the spring receiving member 84 is coupled to the valve body 82 on the injection pipe 90 side of the opening 81a. Because of this structure, the spring load received by the spring receiving member 84 is transmitted to the valve body 82. Furthermore, as shown in FIG. 9B, the spring receiving member 84 has the shape of an open cylinder whose cross section is U-shaped, and the retention portion 84c is formed on the circumferential portion of the bottom surface portion 84d.

Figure 10:
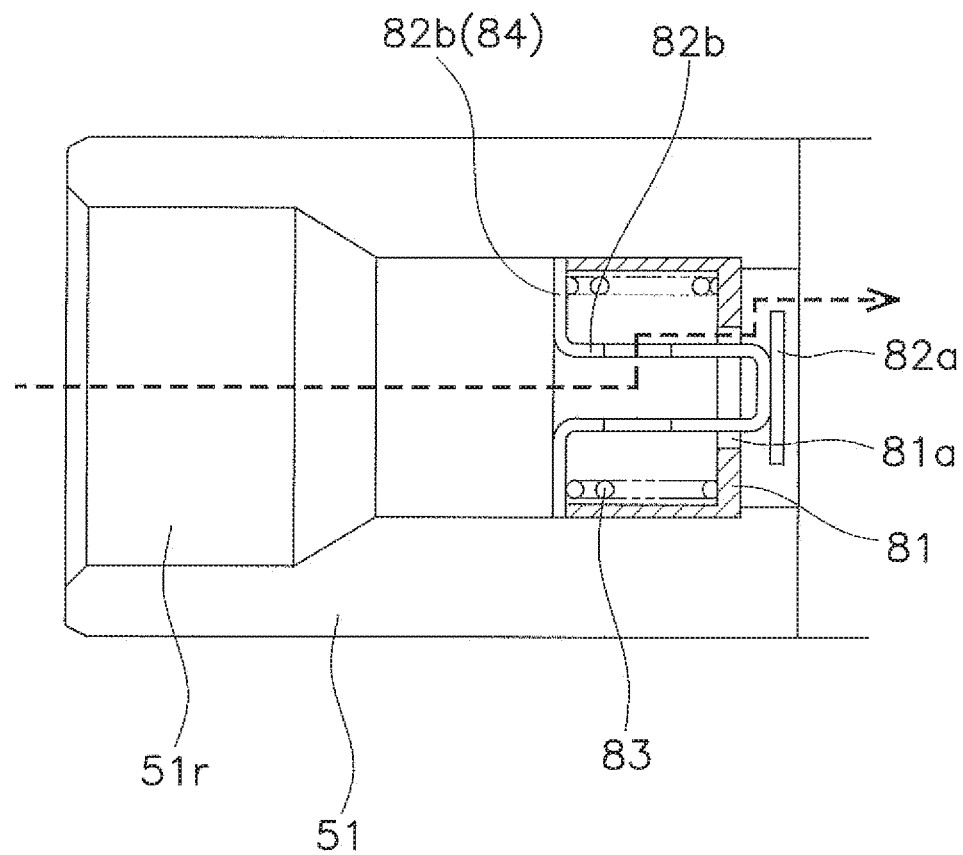
FIG. 10 is a schematic view showing another configuration of the valve assembly 80 pertaining to the same embodiment.

It will be noted that although in the above description the valve shaft portion 82b of the valve body 82 has a rod shape such as shown in FIG. 8, the valve shaft portion 82b may also have a bucket shape such as shown in FIG. 10. In the configuration shown in FIG. 10, part of the valve shaft portion 82b functions as the spring receiving member 84. In addition, the constituent members of the valve assembly 80 can employ arbitrary shapes with which the effects of the invention can be realized.

(4) Operational Actions

The rotary compressor 100 described above acts in the following way.

First, the motor 30 starts up. Because of this, the rotor 32 rotates with respect to the stator 31, and the drive shaft 40 secured to the rotor 32 rotates. When the drive shaft 40 rotates, the eccentric portion 41 of the drive shaft 40 eccentrically rotates. Additionally, the piston 61 having the eccentric portion 41 fitted inside revolves along the cylinder hole 51d in the cylinder 51. At this time, self-rotation of the piston 61 is regulated by the blade 62 formed integrally with the piston 61.

Figure 11:
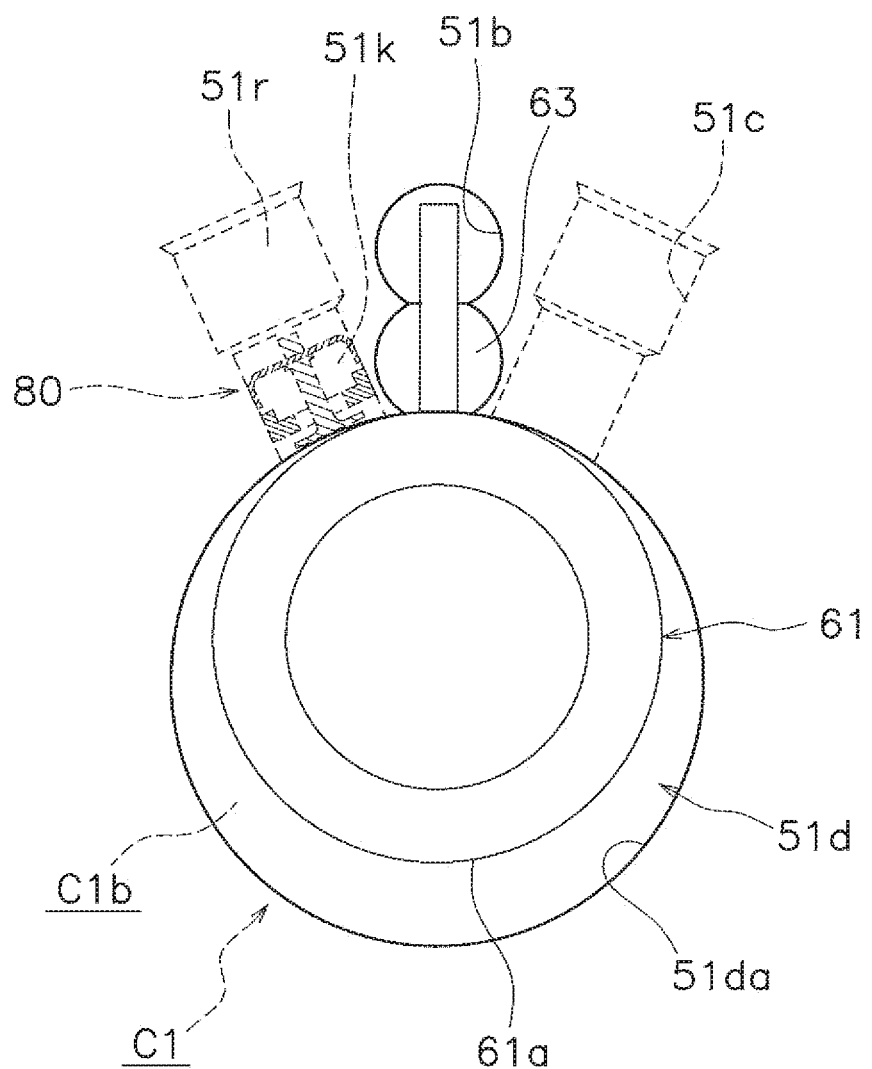
FIG. 11 is a view for describing the actions of the rotary compressor 100 pertaining to the same embodiment.
Figure 12:
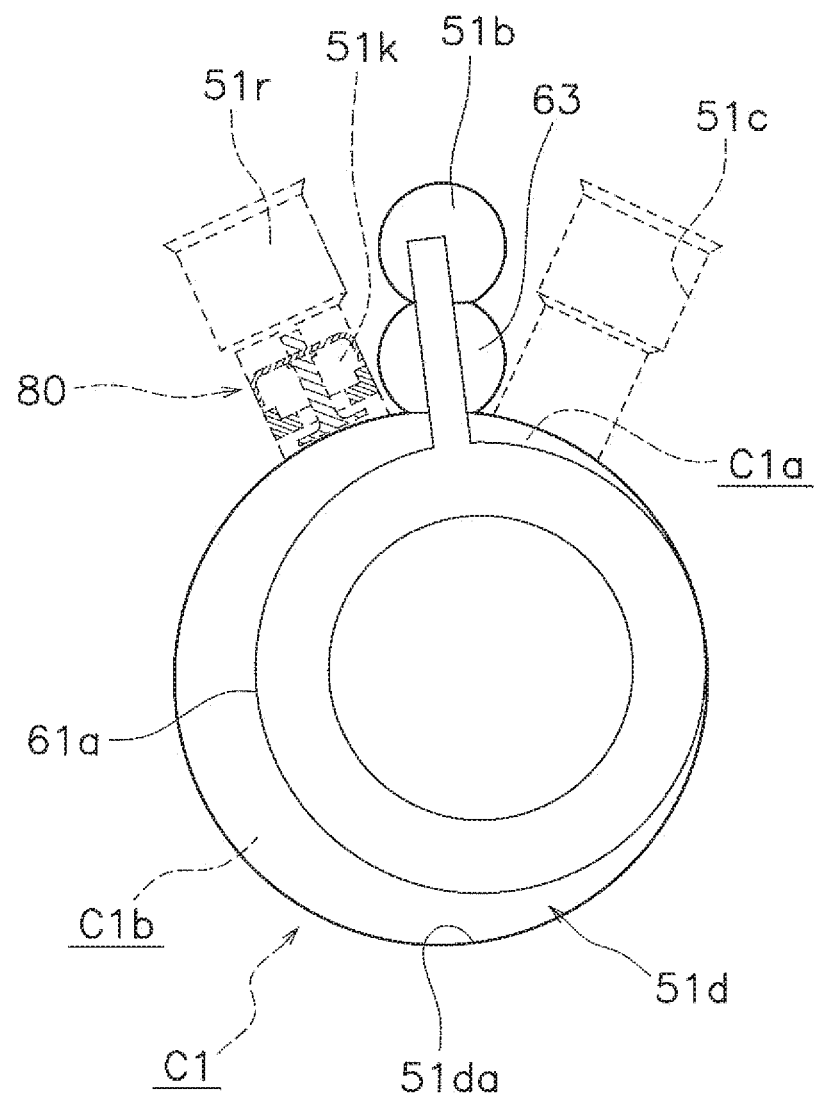
FIG. 12 is a view for describing the actions of the rotary compressor 100 pertaining to the same embodiment.
Figure 13:
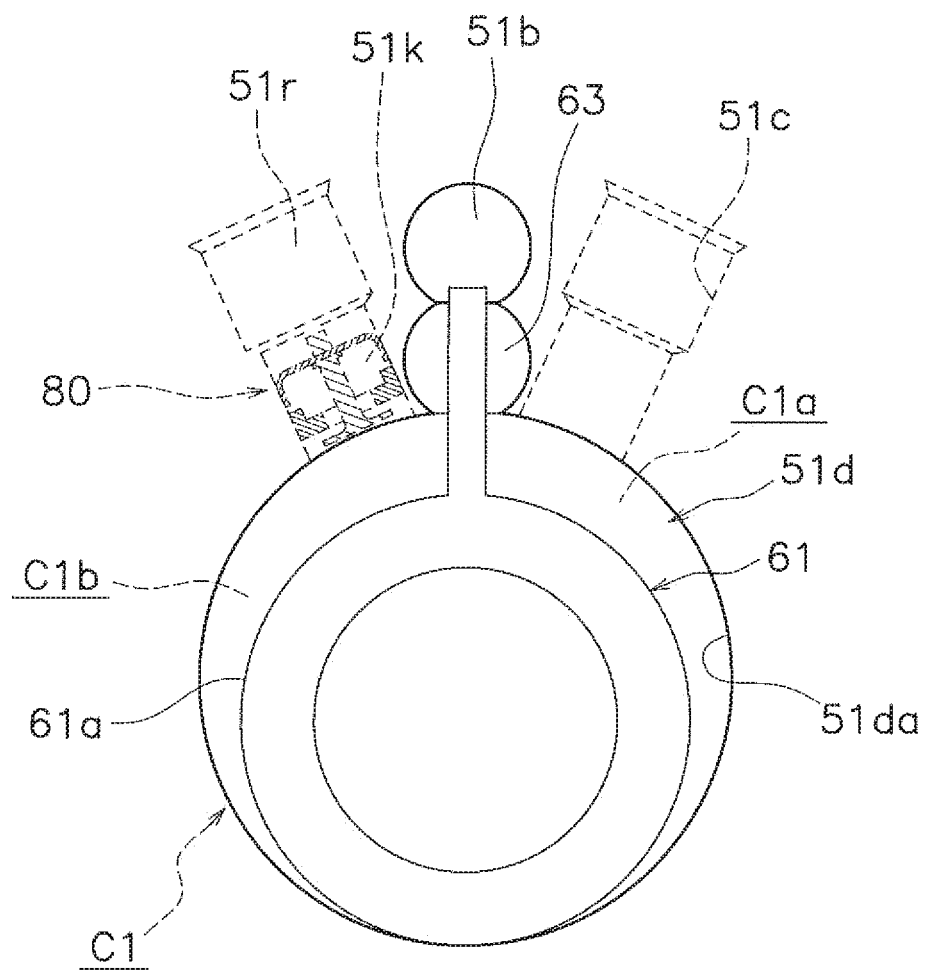
FIG. 13 is a view for describing the actions of the rotary compressor 100 pertaining to the same embodiment.
Figure 14:
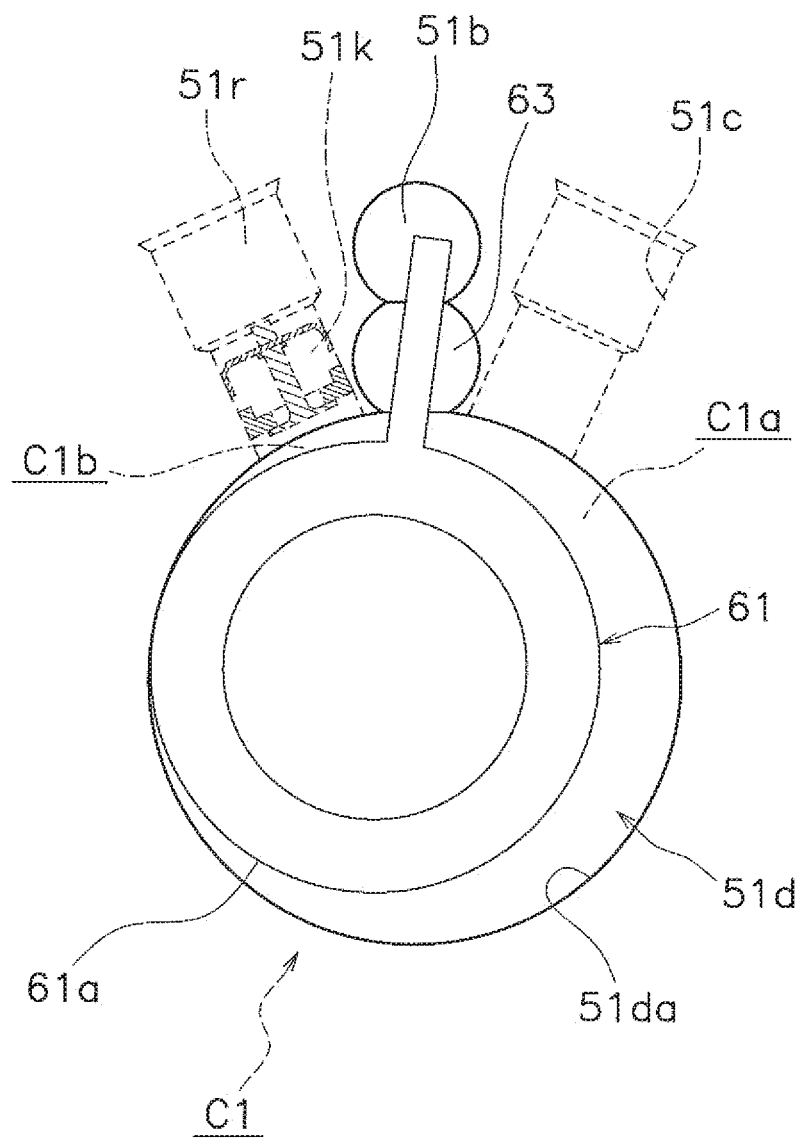
FIG. 14 is a view for describing the actions of the rotary compressor 100 pertaining to the same embodiment.

The piston 61 starts rotating (clockwise in FIG. 11) from the state shown in FIG. 11 in which the piston 61 is at top dead center. Additionally, the process of sucking the refrigerant from the suction passage 51c into the compression chamber C1a is started. When the angle of rotation of the drive shaft 40 becomes larger, the volume of the low-pressure chamber C1a increases (see FIG. 12 to FIG. 14) and the quantity of refrigerant sucked into the low-pressure chamber C1a increases. Additionally, when the piston 61 rotates to top dead center, closure of the refrigerant in the low-pressure chamber C1a is completed.

Next, returning to FIG. 11, the low-pressure chamber C1a that had been connected to the suction passage 51c switches to the high-pressure chamber C1b connected to the discharge passage—not shown in the drawings—that is formed in the front head 52. Additionally, when the angle of rotation of the piston 61 becomes larger, the volume of the high-pressure chamber C1b decreases (see FIG. 12 to FIG. 14). In accompaniment with this, the pressure in the high-pressure chamber C1b increases. When the pressure in the high-pressure chamber C1b exceeds a predetermined pressure, a discharge valve—not shown the drawings—that is provided in the discharge passage opens. Thereafter, the refrigerant in the high-pressure chamber C1b is discharged via the discharge passage to the inside space of the casing 20. Additionally, the compressed refrigerant is discharged via the discharge pipe 24 to the outside of the rotary compressor 100. The process of discharging the refrigerant continues until the angle of rotation of the piston 61 becomes 360 degrees. In the rotary compressor 100, the suction process and the discharge process described above are repeated so that the actions of sucking/compressing the refrigerant are continuously performed.

Here, the intermediate-pressure refrigerant is injected via the injection passage 51r into the compression chamber C1 in the middle of compression. Specifically, when pressure is higher in the injection passage 51r than in the compression chamber C1, the intermediate-pressure refrigerant is injected from the injection passage 51r into the compression chamber C1. When the pressure in the compression chamber C1 becomes higher and pressure becomes higher in the compression chamber C1 than in the injection passage 51r, the valve assembly 80 provided in the injection passage 51r closes and supply of the intermediate-pressure is stopped. In this way, in the rotary compressor 100 pertaining to the present embodiment, compression efficiency is raised by injecting the intermediate-pressure refrigerant.

It will be noted that the inside space of the casing 20 reaches a high pressure because the refrigerant compressed in the compression mechanism 50 is discharged thereto.

Because of this, the high-pressure refrigerating machine oil L in the oil reservoir 25 is supplied to the compression mechanism 50 via the oil pump 42 provided on the lower end portion of the drive shaft 40 and the oil supply passage 43.

(5) Characteristics (5-1)

As described above, in the present embodiment, the rotary compressor 100 has the compression mechanism 50 that compresses low-pressure refrigerant in the compression chamber C1 into high-pressure refrigerant, the injection pipe 90 for supplying intermediate-pressure refrigerant to the compression chamber C1, and the valve assembly 80 that is provided between the compression chamber C1 and the injection pipe 90. Here, the valve assembly 80 has the opening forming member 81, the valve body 82, and the spring member 83. The opening forming member 81 forms the opening 81a. The valve body 82 moves in accordance with differences between the pressure of the refrigerant supplied from the injection pipe 90 and the pressure of the refrigerant in the middle of compression in the compression chamber C1 and blocks the opening 81a when the valve body 82 has moved from the compression chamber C1 side to the injection pipe 90 side. The spring member 83 is disposed on the injection pipe 90 side of the opening 81a and applies force in the direction of the injection pipe 90 to the valve body 82.

Consequently, in the rotary compressor 100 pertaining to the present embodiment, the valve assembly 80 uses the spring member 83 disposed on the injection pipe 90 side of the opening 81a to block the opening 81a, so the dead volume of the injection passage 51r between the opening 81a and the compression chamber C1 can be reduced. Because of this, accumulation of the compressed refrigerant in the space between the open portion in the injection passage 51r and the compression chamber can be reduced. As a result, backflow of the compressed refrigerant to the low-pressure-side compression chamber can be reduced, and the rotary compressor 100 whose compression efficiency is high can be provided.

Figure 15:
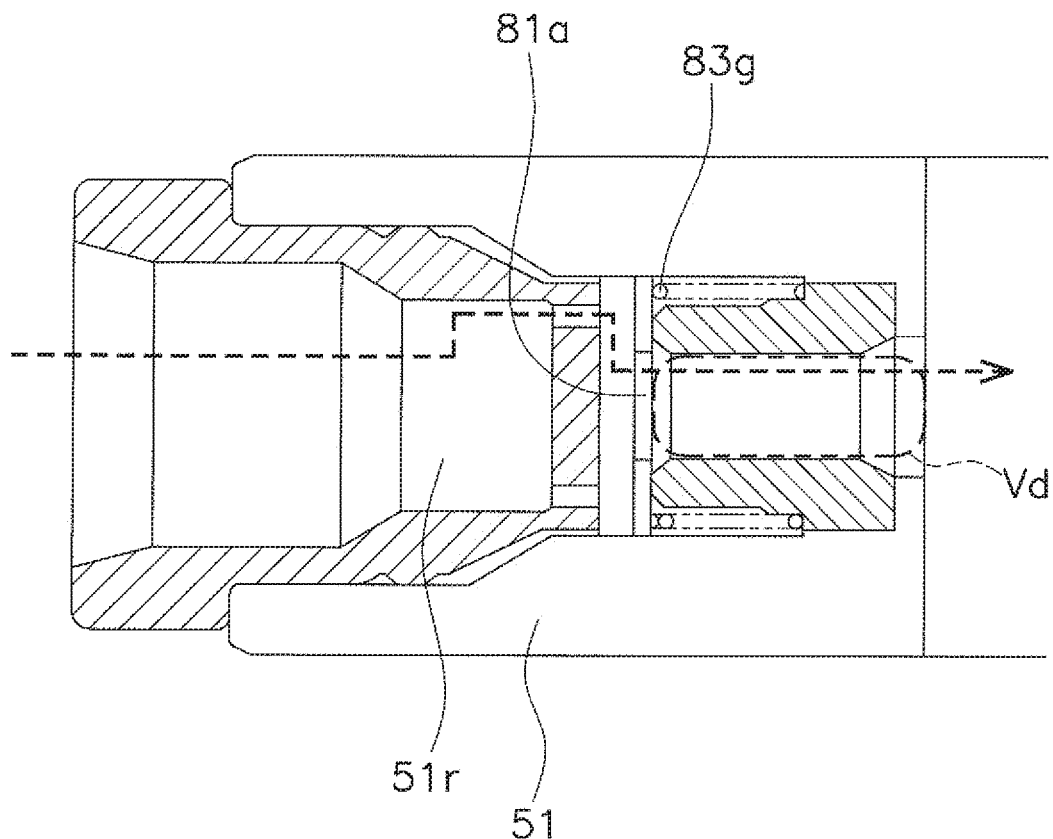
FIG. 15 is a view for describing the effects of the valve assembly 80 pertaining to the same embodiment.
Figure 16:
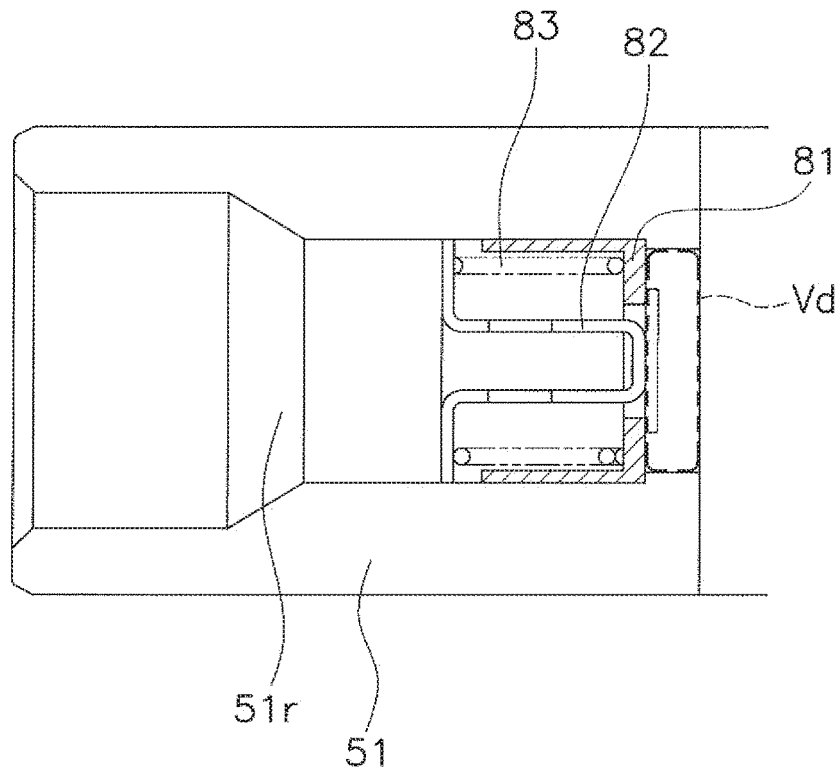
FIG. 16 is a view for describing the effects of the valve assembly 80 pertaining to the same embodiment.

Specifically, in a valve assembly with a common check valve structure, as shown in FIG. 15, a spring member 83g is disposed on the compression chamber C1 side of the opening 81a. For that reason, the dead volume Vd becomes larger. In contrast, in the valve assembly 80 pertaining to the present embodiment, as shown in FIG. 16, the spring member 83 is disposed on the injection pipe 90 side of the opening 81a. For that reason, the dead volume Vd can be reduced. As a result, backflow of the compressed refrigerant to the low-pressure-side compression chamber can be reduced, and a compressor whose compression efficiency is high can be provided.

(5-2)

Furthermore, the valve assembly 80 pertaining to the present embodiment further has, on the injection pipe 90 side of the opening 81a, the spring receiving member 84 (movable member) that is coupled to the valve body 82. Furthermore, the spring member 83 is a compression spring. Additionally, the spring receiving member 84 receives a compression spring load from the spring member 83. In this way, in the present embodiment, the valve assembly 80 in which the compression spring can be used to move the valve body can be provided.

(5-3)

Furthermore, in the valve assembly 80 pertaining to the present embodiment, the opening forming member 81 further has the retention portion 81b that surrounds and retains the periphery of the spring member 83. Because of this, the spring member 83 is retained by the opening forming member 81, so the valve assembly 80 in which detachment of the spring member 83 is deterred and which has an integrated configuration can be provided.

(5-4)

Furthermore, in the valve assembly 80 pertaining to the present embodiment, the retention portion 81b of the opening forming member 81 engages with the spring receiving member 84 (movable member) and regulates the movement of the spring receiving member 84. Here, the spring receiving member 84 is coupled to the valve shaft portion 82b. Consequently, because of this configuration, a situation where the valve body 82 is moved more than necessary by the spring member 83 can be avoided. Specifically, a situation where the valve body pops out into the compression chamber C1 from the injection pipe 90 can be avoided.
(5-5)
Furthermore, in the valve assembly 80 pertaining to the present embodiment, the spring receiving member 84 (movable member) has the flow path openings 84a. Because of this, the intermediate-pressure refrigerant flowing in from the injection pipe 90 can be supplied through the inside of the valve assembly 80 to the compression chamber C1.
(5-6)
Furthermore, in the present embodiment, the compression mechanism 50 has the injection passage 51r, out of which the intermediate-pressure refrigerant flows to the compression chamber C1, and the housing portion 51k, which houses the valve assembly 80. Additionally, the housing portion 51k houses the valve assembly 80 in such a way that the outflow direction d1 of the intermediate-pressure refrigerant that flows out of the opening 81a in the opening forming member 81 and the outflow direction d2 of the intermediate-pressure refrigerant that flows out from the injection passage 51r to the compression chamber C1 are substantially horizontal.

With this rotary compressor 100, the intermediate-pressure refrigerant flows linearly from the injection pipe 90 to the compression chamber C1, so the intermediate-pressure refrigerant can be supplied quickly when the opening 81a is open. Furthermore, in the compression mechanism 50, the injection passage 51r can be provided by forming a through hole in the radial direction of the cylinder 51. Additionally, the rotary compressor 100 having the above-described configuration can be manufactured by simply fitting the valve assembly 80 into this through hole. Consequently, with this configuration, the rotary compressor 100 whose compression efficiency is high can be easily manufactured.

(6) Example Modifications

Example modifications of the present embodiment will be described below. It will be noted that each example modification may be appropriately combined with another example modification to the extent that they do not conflict with each other.

(6-1) Example Modification 1A

Figure 17:
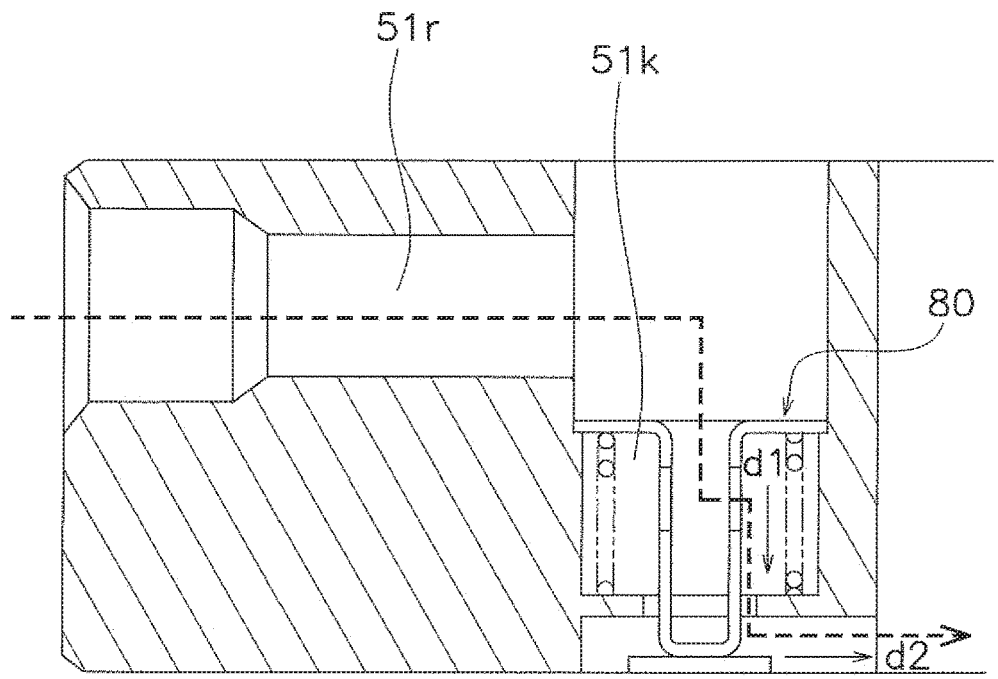
FIG. 17 is a schematic view for describing the housing position of the valve assembly 80 pertaining to example modification A.

In the rotary compressor 100 pertaining to the present embodiment, as shown in FIG. 17, the housing portion 51k that houses the valve assembly 80 may also house the valve assembly in such a way that the outflow direction d1 of the intermediate-pressure refrigerant that flows out of the opening 81a in the opening forming member 81 and the outflow direction d2 of the intermediate-pressure refrigerant that flows out from the injection passage r to the compression chamber C1 are perpendicular.

With this rotary compressor 100, the intermediate-pressure refrigerant bends and flows from the injection pipe 90 to the compression chamber C1, so the opening 81a can be opened gently with respect to pressure changes in the compression chamber C1. Because of this, the intermediate-pressure refrigerant can be inhibited from backflowing to the suction pipe 23. As a result, the rotary compressor 100 whose compression efficiency is high can be provided. Furthermore, the opening forming member and the cylinder can be integrated, and the number of parts can be reduced.

(6-2) Example Modification 1B

Figure 18:
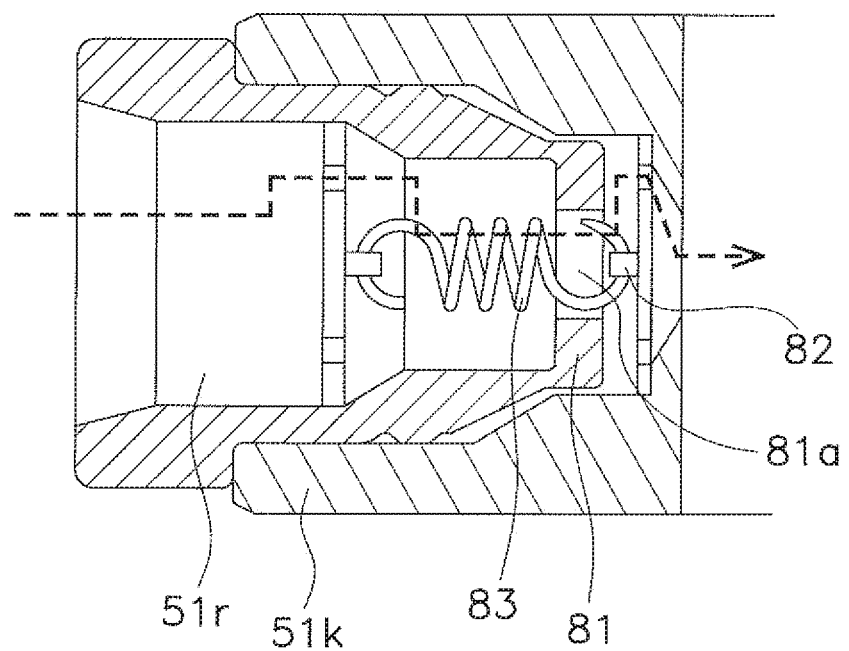
FIG. 18 is a schematic view showing the configuration of the valve assembly 80 pertaining to example modification B.

In the above-described embodiment, the spring member 83 was a compression spring, but the spring member pertaining to the present embodiment is not limited to this. For example, as shown in FIG. 18, the spring member 83 may also be an extension spring that is coupled to the valve body 82 from the injection pipe 90 side of the opening 81a. In this configuration also, the distance between the injection pipe 90 and the compression chamber C1 can be shortened. For that reason, the dead volume Vd can be reduced, and the rotary compressor 100 whose compression efficiency is high can be provided.

(6-3) Example Modification 1C

In the above-described embodiment, the injection pipe 90 is coupled to the cylinder 51, but the compressor pertaining to the present embodiment is not limited to this. The injection pipe 90 may also be coupled to the front head 52 or/and the rear head 53. In this case, the injection passage 51r that communicates with the compression chamber C1 is formed in the front head 52 or/and the rear head 53.

(6-4) Example Modification 1D

In the above-described embodiment, the rotary compressor 100 is a single cylinder-type rotary compressor, but the compressor pertaining to the present embodiment is not limited to this. The rotary compressor may also be a multiple cylinder-type (e.g., a two cylinder-type) rotary compressor.

(6-5) Example Modification 1E

In the above-described embodiment, the compressor is a single cylinder-type rotary compressor, but the compressor pertaining to the present embodiment is not limited to this. Namely, the compressor may also be an arbitrary compressor as long as the valve assembly 80 pertaining to the present embodiment can be installed therein. For example, the valve assembly 80 pertaining to the present embodiment can be installed even in a scroll compressor.

Second Embodiment

A compressor 200 pertaining to a second embodiment of the invention will be described with reference to the drawings. Hereinafter, parts identical to parts that have already been described will be assigned substantially identical reference signs, and redundant description will be omitted.

(7) Overview of Air Conditioning System in which Rotary Compressor is Used

Figure 19:
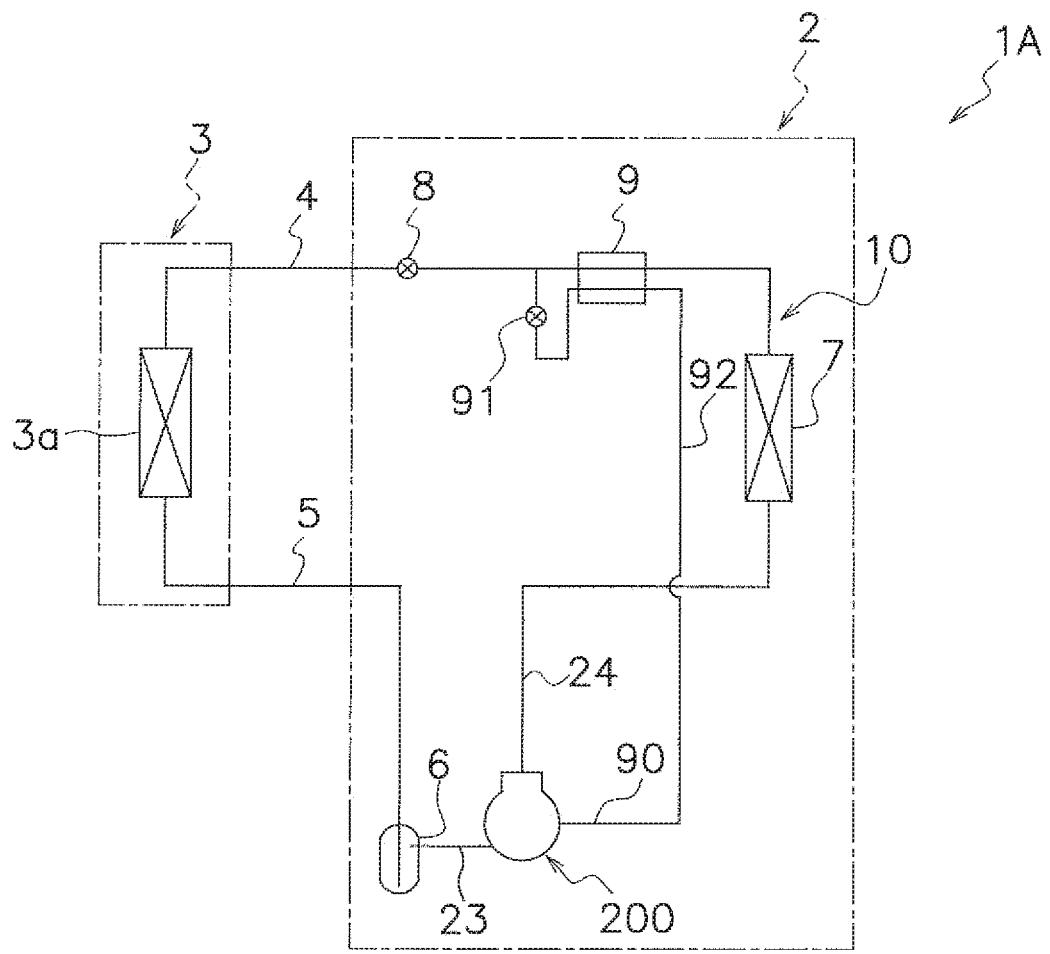
FIG. 19 is an overview diagram of an air conditioning system 1A in which a rotary compressor 200 pertaining to a second embodiment of the invention is used.

FIG. 19 is an overview diagram of an air conditioning system 1A in which the rotary compressor 200 pertaining to the second embodiment of the invention is used. In the second embodiment also, the same refrigerant circuit as in the first embodiment is realized.

(8) Overall Configuration of Rotary Compressor

Figure 20:
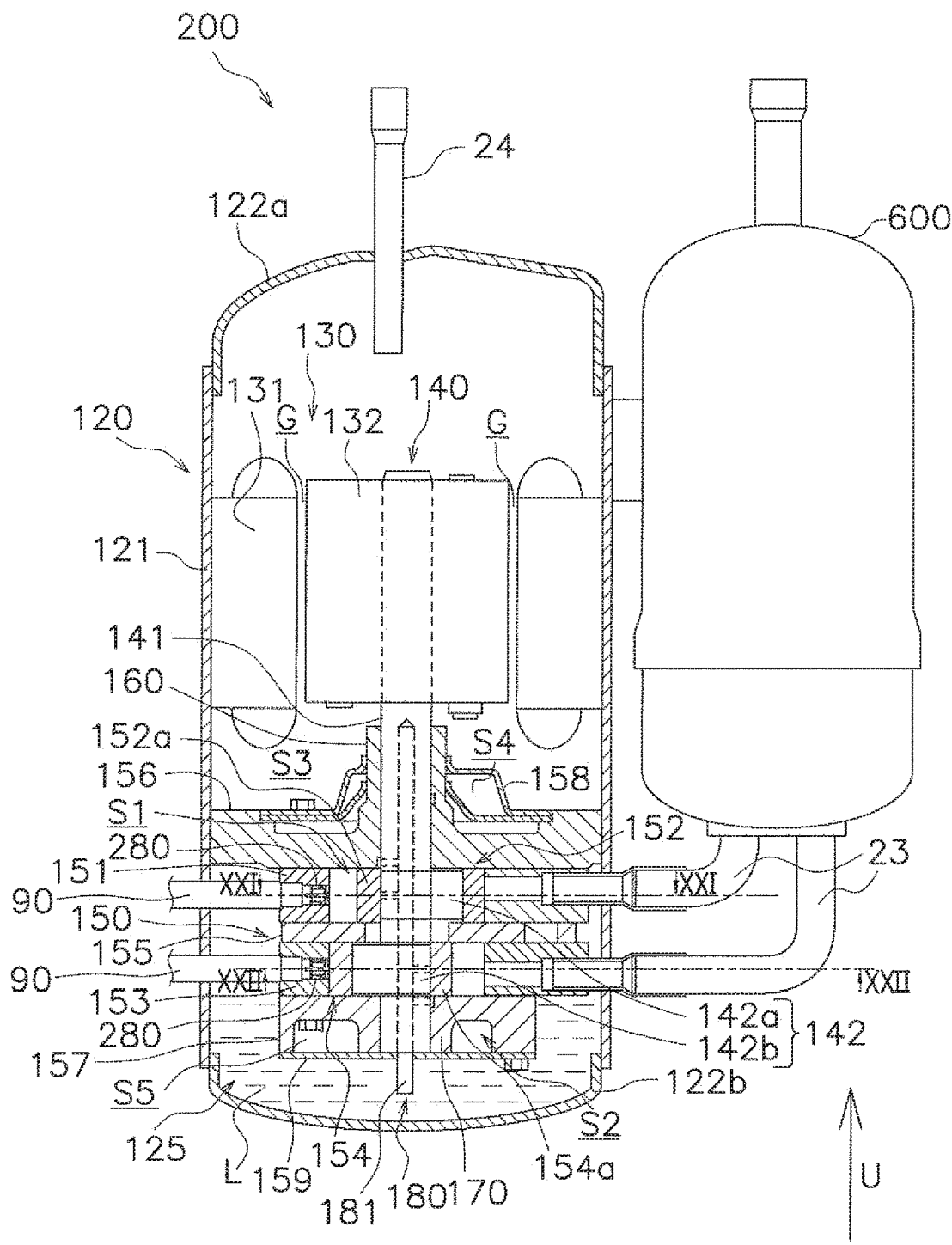
FIG. 20 is a longitudinal sectional view schematically showing the rotary compressor 200 pertaining to the same embodiment.
Figure 21:
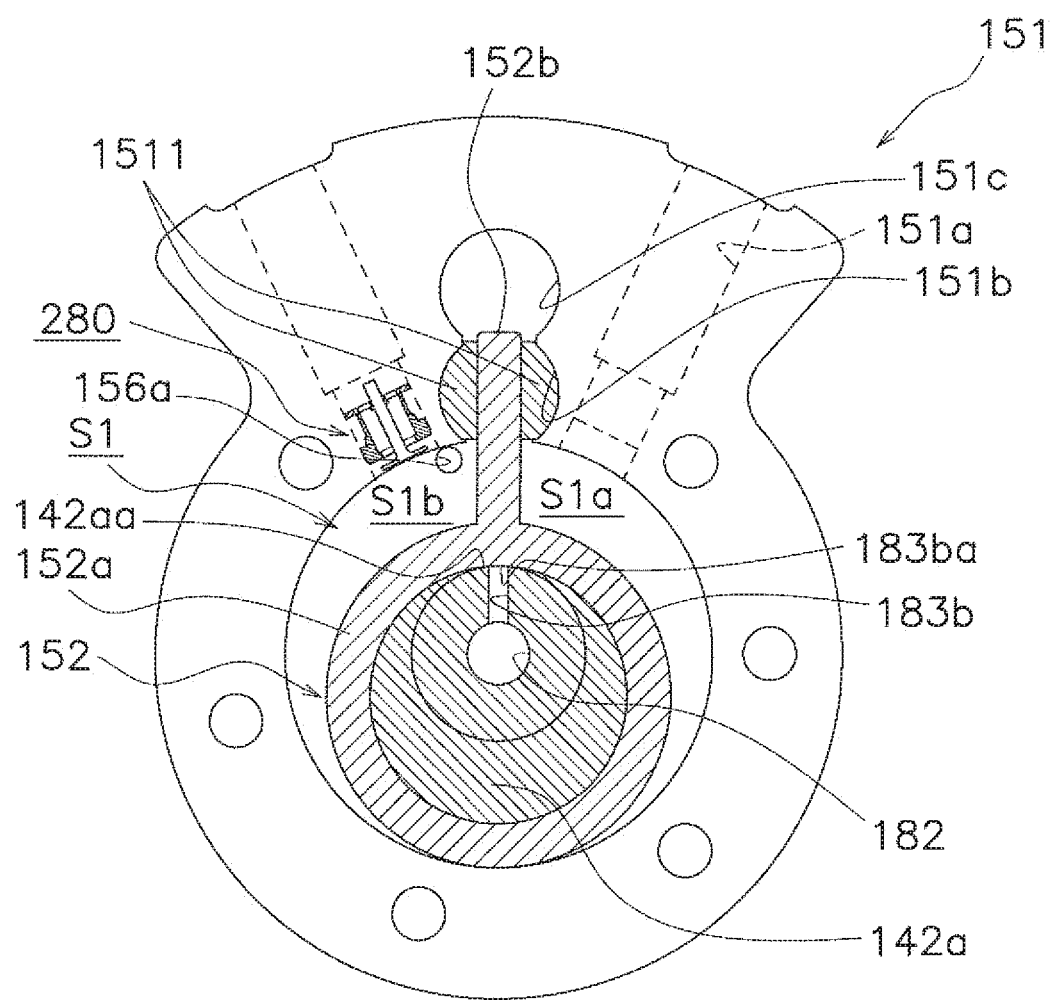
FIG. 21 is a general sectional view of a front cylinder 151 as seen along arrows XXI-XXI of FIG. 20.
Figure 22:
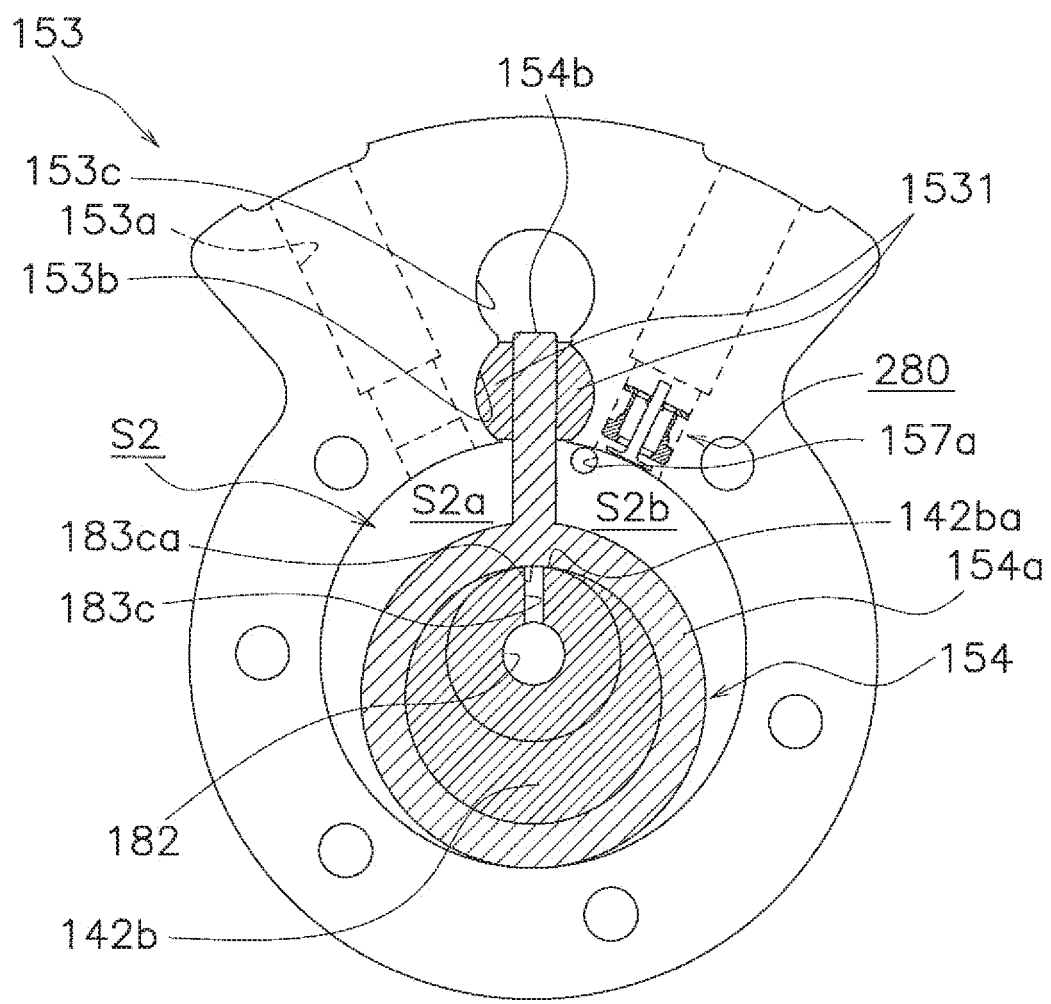
FIG. 22 is a general sectional view of a rear cylinder 153 as seen along arrows XXII-XXII of FIG. 20.

FIG. 20 is a longitudinal sectional view schematically showing the rotary compressor 200 pertaining to the second embodiment. FIG. 21 is a general sectional view of a front cylinder 151 as seen along arrows XXI-XXI of FIG. 20. FIG. 22 is a general sectional view of a rear cylinder 153 as seen along arrows XXII-XXII of FIG. 20.

It will be noted that in the following description, unless otherwise specified the direction of arrow U in FIG. 20 indicates an upward direction. Furthermore. FIG. 20 shows a sectional view in different directions on the right side and the left side from the center. Namely, in FIG. 20, valve assemblies 280 and injection pipes 90 are shown in positions opposing suction pipes 23, but in reality the valve assemblies 280 and the injection pipes 90 are disposed in positions in which the efficiency of intermediate-pressure refrigerant injection is optimized.

Here, the rotary compressor 200 is a two cylinder-type rotary compressor. The rotary compressor 200 mainly has a casing 120, a motor 130, a drive shaft 140, and a compression mechanism 150. The motor 130, the drive shaft 140, and the compression mechanism 150 are housed in the casing 120. Inside the casing 120, the motor 130 is disposed in the vicinity of the up and down direction central portion of the casing 120, and the compression mechanism 150 is disposed thereunder.

The rotary compressor 200 is a device that sucks in and compresses low-pressure refrigerant from the suction pipes 23 and discharges high-pressure refrigerant from the discharge pipe 24. Furthermore, intermediate-pressure refrigerant is supplied to the rotary compressor 200 from the injection pipes 90. As the refrigerant in the rotary compressor 200, R32, for example, is used, but the refrigerant is not limited to this.

(9) Detailed Configuration (9-1) Casing

As shown in FIG. 20, the casing 120 of the rotary compressor 200 has an open cylinder-shaped open cylinder member 121 whose top and bottom are open, an upper cap 122a that is provided above the open cylinder member 121, and a lower cap 122b that is provided under the open cylinder member 121.

In the lower portion of the open cylinder member 121, two suction pipes 23 are provided running through the side surface of the lower portion of the open cylinder member 121. In the upper portion of the casing 120, the discharge pipe 24 that discharges the refrigerant after compression is provided running through the upper cap 122a.

Housed inside the casing 120 are mainly the motor 130, the rotary compression mechanism 150 that is disposed under the motor 130, the drive shaft 140 that intercouples the motor 130 and the rotary compression mechanism 150, and an upper bearing portion 160 and a lower bearing portion 170 that pivotally support the drive shaft 140. The drive shaft 140 is disposed extending in the up and down direction along the central axis of the open cylinder member 121.

Furthermore, in the bottom portion of the casing 120 is formed an oil reservoir 125 that stores refrigerating machine oil L shown in FIG. 20. The refrigerating machine oil L is used to lubricate the rotary compression mechanism 150, the upper bearing portion 160 and the lower bearing portion 170, etc.

It will be noted that the rotary compressor 200 pertaining to the present embodiment is what is called a high-pressure dome-type compressor. The oil reservoir 125 communicates via a high-pressure space S3 with a high-pressure-side compression chamber S1b in the front cylinder 151 and a high-pressure-side compression chamber S2b in the rear cylinder 153 described later.

(9-2) Motor

The motor 130 is provided to drive the rotary compression mechanism 150 disposed thereunder. The motor 130 is operated in a wide speed range from a low speed to a high speed.

The motor 130 includes a stator 131 and a rotor 132. The stator 131 is an annular member and is secured to the inner wall surface of the open cylinder member 121 of the casing 120. The rotor 132 is rotatably disposed, via the stator 131 and an air gap space G, in the inside space of the stator 131. The upper portion of a main shaft 141 of the drive shaft 140 that extends in the up and down direction is secured to the central portion of the rotor 132, so that the rotor 132 and the drive shaft 140 are coupled to each other. The motor 130 causes the rotor 132 to rotate by means of magnetic force generated between the stator 131 and the rotor 132 and drives the rotary compression mechanism 150 via the drive shaft 140.

(9-3) Drive Shaft

The drive shaft 140 has the closed cylinder-shaped main shaft 141, which extends along the central axis of the open cylinder member 121 of the casing 120, and an eccentric portion 142, which is eccentric with respect to the main shaft 141. Furthermore, an oil supply path 180 for supplying the oil L accumulated in the oil reservoir 125 to the rotary compression mechanism 150, the upper bearing portion 160, and the lower bearing portion 170 is formed in the drive shaft 140.

As shown in FIG. 20, the eccentric portion 142 has a first eccentric portion 142a and a second eccentric portion 142b whose phase is shifted 180° from that of the first eccentric portion 142a.

As shown in FIG. 21, the first eccentric portion 142a is rotatably fitted into the inside of a later-described piston body portion 152a. That is to say, the drive shaft 140 is coupled to a piston 152 via the first eccentric portion 142a. A first contact surface 142aa that contacts the inner surface of the piston body portion 152a is formed in the first eccentric portion 142a.

As shown in FIG. 22, the second eccentric portion 142b is rotatably fitted into the inside of a later-described piston body portion 154a. That is to say, the drive shaft 140 is coupled to a piston 154 via the second eccentric portion 142b. A second contact surface 142ba that contacts the inner surface of the piston body portion 154a is formed in the second eccentric portion 142b.

The oil supply path 180 has a suction member 181, a primary oil supply path 182, and secondary oil supply paths 183. The suction member 181 is a hollow member whose lower end is disposed inside the oil reservoir 125. The primary oil supply path 182 communicates with the oil reservoir 125 via the suction member 181 and is formed inside the drive shaft 140 along the central axis of the open cylinder member 121 of the casing 120. The secondary oil supply paths 183 are formed branching from the primary oil supply path 182.

(9-4) Rotary Compression Mechanism

The rotary compression mechanism 150 is a two cylinder-type compression mechanism having two cylinders. The rotary compression mechanism 150 compresses and discharges refrigerant sucked in from the suction pipes 23.

As shown in FIG. 20, the rotary compression mechanism 150 mainly has the front cylinder 151, the piston 152, the rear cylinder 153, the piston 154, a middle plate 155, a front head 156, a rear head 157, a front muffler 158, and a rear muffler 159. The rear cylinder 153 and the piston 154 are disposed under the front cylinder 151. The middle plate 155 is disposed between the front cylinder 151 and the rear cylinder 153. The front head 156 and the rear head 157 are provided sandwiching the front cylinder 151 and the rear cylinder 153 from above and below. The front muffler 158 is disposed above the front head 156. The rear muffler 159 is disposed under the rear head 157.

(9-4-1) Front Cylinder

As shown in FIG. 21, formed in the front cylinder 151 are a cylinder space (compression chamber) S1, a suction hole 151a, a bush housing hole 151b, and a blade housing hole 151c.

The cylinder space S1 is a space whose periphery is surrounded by the front cylinder 151, the front head 156, and the middle plate 155. The piston 152 is disposed inside the cylinder space S1, and the cylinder space S1 is partitioned by the piston 152 into a low-pressure-side compression chamber S1a with which the suction hole 151a communicates and a high-pressure-side compression chamber S1b with which a discharge hole 156a formed in the later-described front head 156 communicates.

The suction hole 151a runs through the front cylinder 151 in the radial direction thereof and communicates a suction pipe 23 to the low-pressure-side compression chamber S1a.

The bush housing hole 151b is a closed cylinder-shaped hole that runs through the front cylinder 151 in the plate thickness direction thereof. A pair of semicircular bushes 151l are housed in the bush housing hole 151b in such a way as to sandwich a blade 152b of the later-described piston 152. The bushes 151l are swingably attached to the front cylinder 151.

The blade housing hole 151c is a closed cylinder-shaped hole that runs through the front cylinder 151 in the plate thickness direction thereof and communicates with the bush housing hole 151b.

(9-4-2) Piston

The piston 152 is disposed inside the front cylinder 151 and forms the low-pressure-side and high-pressure-side compression chambers S1a and S1b inside the cylinder space S1 in the front cylinder 151. The piston 152 eccentrically rotates, whereby the refrigerant sucked into the low-pressure-side compression chamber S1a is compressed in the high-pressure-side compression chamber S1b.

As shown in FIG. 21, the piston 152 has the annular piston body portion 152a and the flat plate-shaped blade 152b that extends outward in the radial direction from the piston body portion 152a.

The first eccentric portion 142a of the drive shaft 140 is insertingly fitted into the piston body portion 152a. When the drive shaft 140 rotates, the piston body portion 152a eccentrically rotates while sliding against the inner peripheral surface of the front cylinder 151, and the blade 152b swings and simultaneously moves back and forth along its longitudinal direction. At this time, the refrigerant sucked into the low-pressure-side compression chamber S1a from the suction pipe 23 is compressed in the high-pressure-side compression chamber S1b by the piston body portion 152a and is discharged to a muffler space S4 from the discharge hole 156a formed in the later-described front head 156.

(9-4-3) Rear Cylinder

As shown in FIG. 22, formed in the rear cylinder 153 are a cylinder space (compression chamber) S2, a suction hole 153a, a bush housing hole 153b, and a blade housing hole 153c.

The cylinder space S2 is a space whose periphery is surrounded by the rear cylinder 153, the rear head 157, and the middle plate 155. The piston 154 is disposed inside the cylinder space S2, and the cylinder space S2 is partitioned by the piston 154 into a low-pressure-side compression chamber S2a with which the suction hole 153a communicates and a high-pressure-side compression chamber S2b with which a discharge hole 157a formed in the later-described rear head 157 communicates.

The suction hole 153a runs through the rear cylinder 153 in the radial direction thereof and communicates a suction pipe 23 to the low-pressure-side compression chamber S2a.

The bush housing hole 153b is a closed cylinder-shaped hole that runs through the rear cylinder 153 in the plate thickness direction thereof. A pair of semicircular bushes 153l are housed in the bush housing hole 153b in such a way as to sandwich a blade 154b of the later-described piston 154. The bushes 153l are swingably attached to the rear cylinder 153.

The blade housing hole 153c is a closed cylinder-shaped hole that runs through the rear cylinder 153 in the plate thickness direction thereof and communicates with the bush housing hole 153b.

(9-4-4) Piston

The piston 154 is disposed inside the rear cylinder 153 and forms the low-pressure-side and high-pressure-side compression chambers S2a and S2b inside the cylinder space S2 in the rear cylinder 153. The piston 154 eccentrically rotates, whereby the refrigerant sucked into the low-pressure-side compression chamber S2a is compressed in the high-pressure-side compression chamber S2b.

As shown in FIG. 22, the piston 154 has the annular piston body portion 154a and the flat plate-shaped blade 154b that extends outward in the radial direction from the piston body portion 154a.

The second eccentric portion 142b of the drive shaft 140 is insertingly fitted into the piston body portion 154a. When the drive shaft 140 rotates, the piston body portion 154a eccentrically rotates while sliding against the inner peripheral surface of the rear cylinder 153, and the blade 154b swings and simultaneously moves back and forth along its longitudinal direction. At this time, the refrigerant sucked into the low-pressure-side compression chamber S2a from the suction pipe 23 is compressed in the high-pressure-side compression chamber S2b by the piston body portion 154a and is discharged to a muffler space S5 from the discharge hole 157a formed in the later-described rear head 157.

(9-4-5) Middle Plate

As shown in FIG. 20, the middle plate 155 is disposed between the front cylinder 151 and the rear cylinder 153. The middle plate 155 closes the lower opening of the cylinder space S1 in the front cylinder 151 and closes the upper opening of the cylinder space S2 in the rear cylinder 153.

(9-4-6) Front Head

The front head 156 is disposed above the front cylinder 151. The front head 156 closes the upper opening of the cylinder space S1 in the front cylinder 151. Furthermore, the upper bearing portion 160 that pivotally supports the drive shaft 140 that extends in the up and down direction is formed integrally with the front head 156. The upper bearing portion 160 will be described later.

The discharge hole 156a for discharging to the later-described muffler space S4 the refrigerant inside the high-pressure-side compression chamber S1b compressed by the eccentric rotational driving of the piston 152 is formed in the front head 156 (see FIG. 21). The discharge hole 156a is formed running through the front head 156 in the up and down direction. A discharge valve not shown in the drawings is disposed above the discharge hole 156a.

(9-4-7) Rear Head

The rear head 157 is disposed under the rear cylinder 153. The rear head 157 closes the lower opening of the cylinder space S2 in the rear cylinder 153. Furthermore, the lower bearing portion 170 that pivotally supports the drive shaft 140 that extends in the up and down direction is formed integrally with the rear head 157. The lower bearing portion 170 will be described later.

The discharge hole 157a for discharging to the later-described muffler space S5 the refrigerant inside the high-pressure-side compression chamber S2b compressed by the eccentric rotational driving of the piston 154 is formed in the rear head 157 (see FIG. 22). The discharge hole 157a is formed running through the rear head 157 in the up and down direction. A discharge valve not shown in the drawings is disposed under the discharge hole 157a.

(9-4-8) Front Muffler

The front muffler 158 is provided above the front head 156, and the muffler space S4 is formed between the front muffler 158 and the front head 156. Because the muffler space S4 is formed, noise associated with the discharge of the refrigerant from the high-pressure-side compression chamber S1b is reduced.

Furthermore, a discharge hole not shown in the drawings is formed in the front muffler 158 in order to discharge the refrigerant from the muffler space S4. The refrigerant inside the muffler space S4 passes through the discharge hole not shown in the drawings and is discharged to the high-pressure space S3 above the front muffler 158, that is, above the front head 156. The refrigerant discharged to the high-pressure space S3 passes through the air gap space G between the stator 131 and the rotor 132 of the motor 130, moves upward inside the casing 120, and is discharged from the discharge pipe 24.

(9-4-9) Rear Muffler

The rear muffler 159 is provided under the rear head 157, and the muffler space S5 is formed between the rear muffler 159 and the rear head 157. Because the muffler space S5 is formed, noise associated with the discharge of the refrigerant from the high-pressure-side compression chamber S2b is reduced.

The refrigerant in the muffler space S5 passes through a communicating hole—not shown in the drawings-formed communicating the rear head 157, the rear cylinder 153, the middle plate 155, the front cylinder 151, and the front head 156 and flows into the muffler space S4.

(9-5) Upper Bearing Portion

The upper bearing portion 160 is formed integrally with the front head 156 and pivotally supports the drive shaft 140 that extends in the up and down direction. Namely, the drive shaft 40 is insertingly fitted into an open portion in the center of the upper bearing portion 160.

(9-6) Lower Bearing Portion

The lower bearing portion 170 is formed integrally with the rear head 157 and pivotally supports the drive shaft 140 that extends in the up and down direction. Namely, the drive shaft 140 is insertingly fitted into an open portion in the center of the lower bearing portion 170.

(9-7) Valve Assemblies

Figure 23:
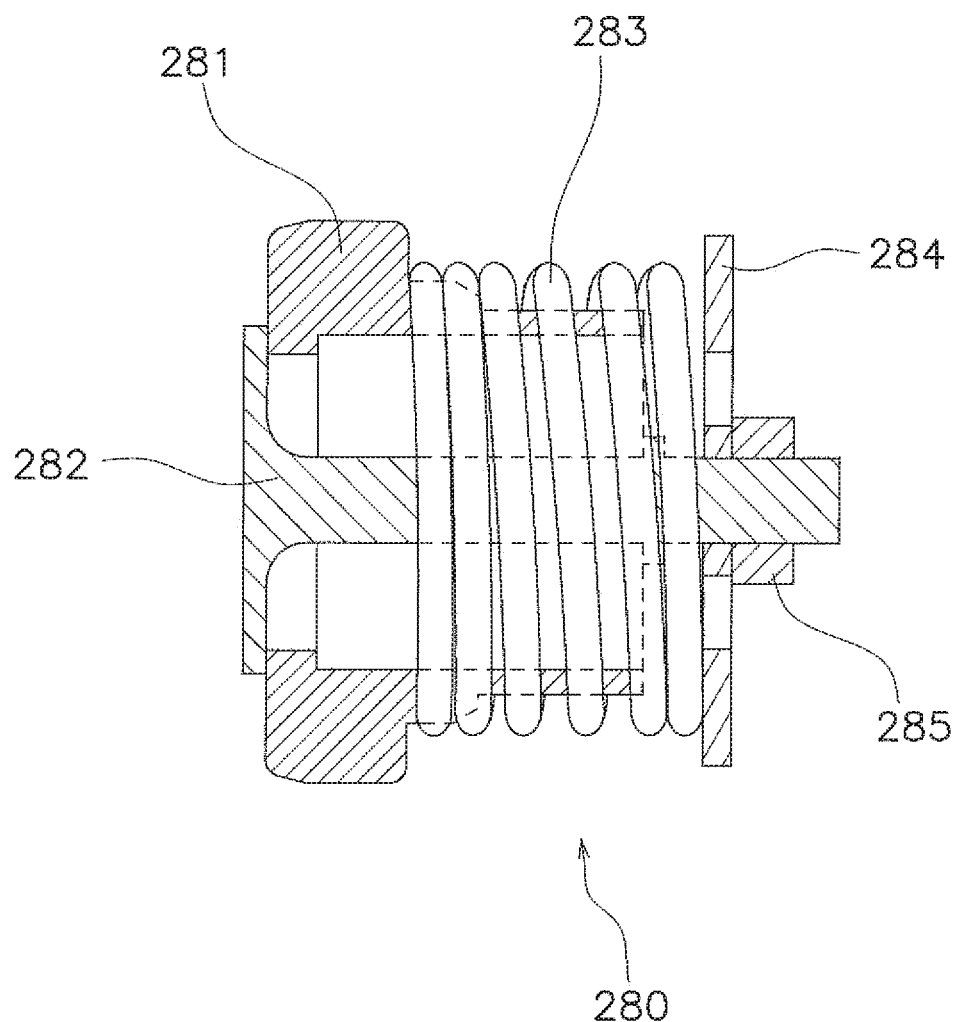
FIG. 23 is a schematic view showing the configuration of a valve assembly 280 pertaining to the same embodiment.
Figure 24:
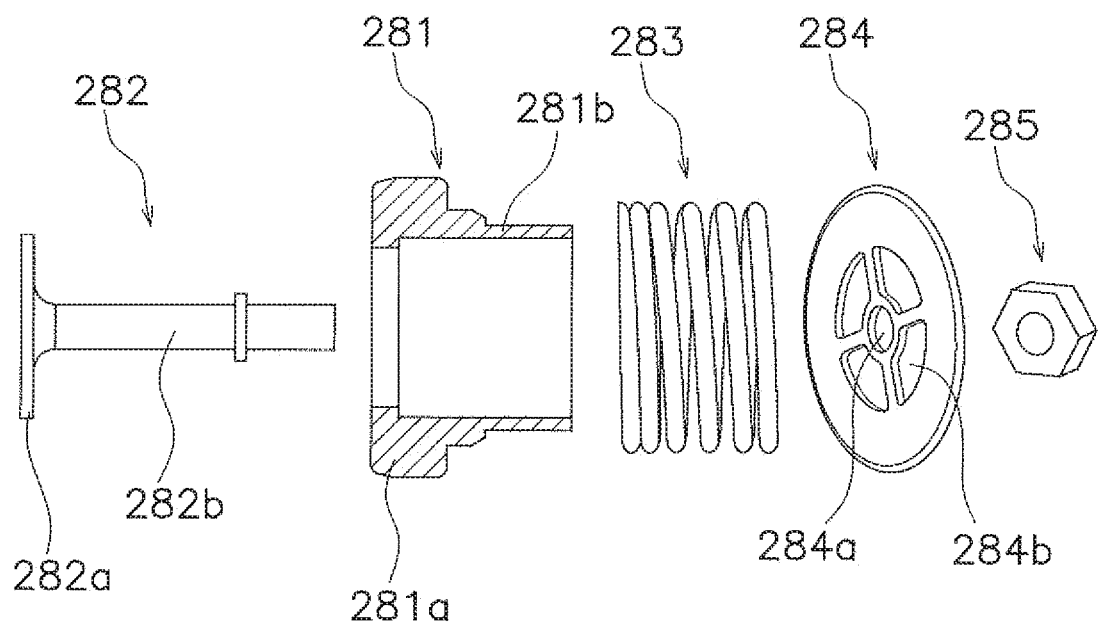
FIG. 24 is an exploded schematic view showing constituent members of the valve assembly 280 pertaining to the same embodiment.

The valve assemblies 280 are provided between the compression chambers S1b, S2b in the front cylinder 151 and the rear cylinder 153 and the injection pipes 90 and function as check valves. Specifically, as shown in FIGS. 23 and 24, each valve assembly 280 has an opening forming member 281, a valve body 282, a spring member 283, a spring receiving member (movable member) 284, and a fastening member 285. It will be noted that FIG. 24 is an exploded schematic view showing the constituent members of each valve assembly 280.

Figure 25:
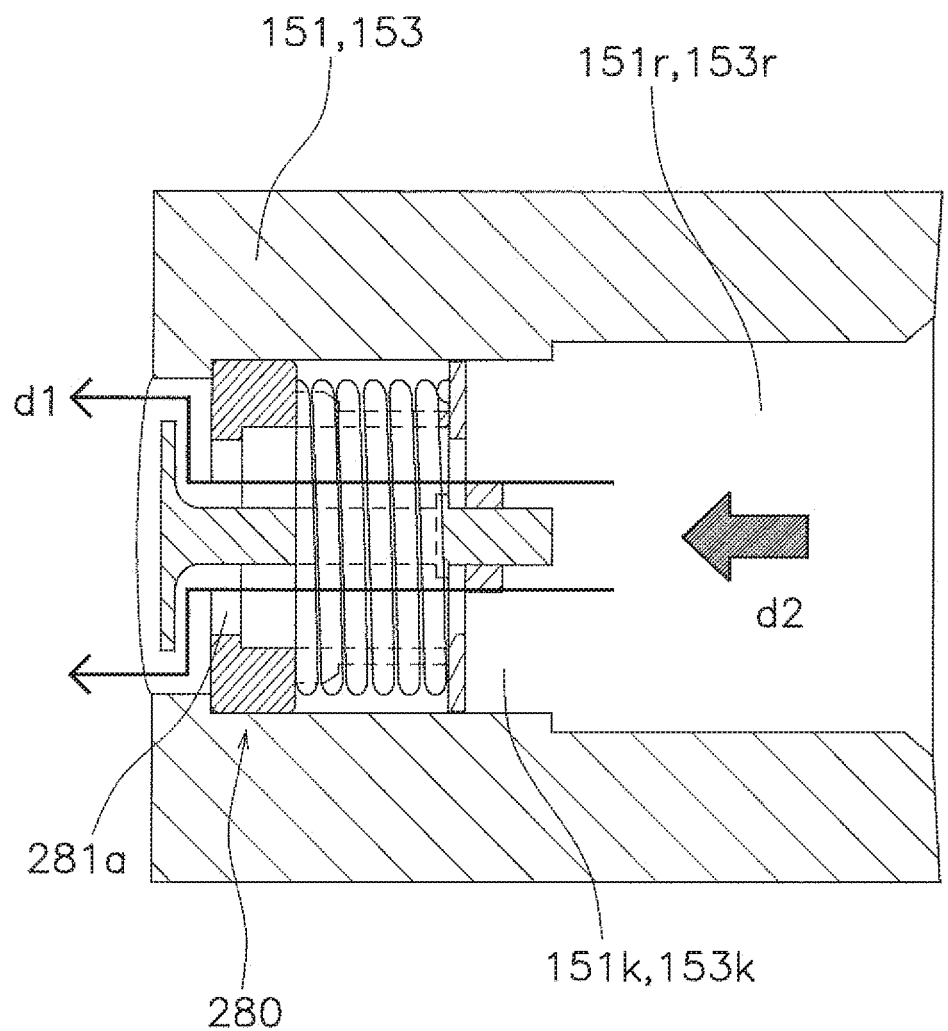
FIG. 25 is a schematic view for describing a housing position of the valve assembly 280 pertaining to the same embodiment.

In the present embodiment, as shown in FIG. 25, the valve assemblies 280 are housed in housing portions 151k, 153k in the cylinders 151, 153 in such a way that the outflow direction d1 of the intermediate-pressure refrigerant that flows out of an opening 281a in the opening forming member 281 and the outflow direction d2 of the intermediate-pressure refrigerant that flows out from the injection passages 151r, 153r to the compression chambers are substantially horizontal.

The opening forming member 281 has, like the opening forming member 81 pertaining to the first embodiment, a flat plate-shaped portion in which the opening 281a is formed. The opening 281a is closed by tight contact with a flat plate portion 282a of the valve body 282 described later. The outer periphery of the opening forming member 281 is in tight contact with the housing portion 151k, so when the opening 281a is closed, backflow of the refrigerant from the compression chambers is checked. Furthermore, the opening forming member 281 has an open cylinder portion 281b. The open cylinder portion 281b is provided surrounding a later-described valve shaft portion 282b. Moreover, the spring member 283 is disposed on the outer side of the open cylinder portion 281b. The open cylinder portion 281b engages with the later-described spring receiving member 284 and regulates movement of the spring member 283.

The valve body 282 has the flat plate-shaped flat plate portion 282a. Furthermore, the valve body 282 is provided with the rod-shaped valve shaft portion 282b on the central axis of the flat plate portion 282a. The valve shaft portion 282b passes through the opening 281a in the opening forming member 281 and is coupled to the spring receiving member 284. Because of this, the valve body 282 also moves in accordance with the movement of the spring receiving member 284 to which the spring load applied. Specifically, the valve body 282 moves in accordance with differences between the pressure of the intermediate-pressure refrigerant supplied from the injection pipe 90 and the pressure of the refrigerant in the middle of compression in the compression chamber. Additionally, the valve body 282 closes the opening 281a in the opening forming member 281 when the valve body 282 has moved from the compression chamber side to the injection pipe 90 side.

The spring member 283 is disposed on the injection pipe 90 side of the opening 281a and applies force in the direction of the injection pipe 90 to the valve body 282. Here, a compression spring is employed as the spring member 283. The spring member 283 is disposed on the outer side of, so as to surround, the open cylinder portion 281b.

The spring receiving member 284 is a flat plate-shaped member that has a larger diameter than the diameter of the spring member 283. The spring receiving member 284 is a member that contacts the compression spring of the spring member 283, and a compression spring load is applied to the spring receiving member 284. Furthermore, the spring receiving member 284 has flow path openings 284a and a coupling hole 284b. The valve shaft portion 282b of the valve body is inserted into and secured to the coupling hole 284b. Namely, the spring receiving member 284 is coupled to the valve body 282 on the injection pipe 90 side of the opening 281a. Because of this structure, the spring load received by the spring receiving member 284 is transmitted to the valve body 282.

The fastening member 285 is a member that screws onto the end portion of the valve shaft portion 282b on the injection pipe 90 side. The fastening member 285 is secured to the valve shaft portion 282b, whereby the opening forming member 281, the valve body 282, the spring member 283, and the spring receiving member 284 are integrated.

It will be noted that the constituent members of each valve assembly 280 can employ arbitrary shapes with which the effects of the invention can be realized.

(10) Operational Actions

The rotary compressor 200 described above acts in the following way.

First, the motor 130 starts up. Because of this, the rotor 132 rotates with respect to the stator 131, and the drive shaft 140 secured to the rotor 132 rotates. When the drive shaft 140 rotates, the piston 152 and the piston 154 coupled to the first eccentric portion 142a and the second eccentric portion 142b of the drive shaft 140 are driven. Because of this, the refrigerant is compressed inside the front cylinder 151 and the rear cylinder 153 and is discharged to the muffler spaces S4, S5.

Specifically, when the drive shaft 140 rotates, in the front cylinder 151 the first contact surface 142aa of the first eccentric portion 142a slides against the inner peripheral surface of the annular piston body portion 152a. Additionally, the blade 152b of the piston 152 swings and simultaneously moves back and forth along its longitudinal direction, and the piston body portion 152a eccentrically rotates. The outer peripheral surface of the piston body portion 152a slides against the inner peripheral surface of the front cylinder 151.

At this time, the low-pressure-side compression chamber S1a that communicates with the suction hole 151a is partitioned inside the front cylinder 151, and the refrigerant is sucked from the accumulator 6. Furthermore, at the same time in the high-pressure-side compression chamber S1b that communicates with the discharge hole 156a, the refrigerant is compressed, and when it reaches a predetermined pressure, the refrigerant pushes up the discharge valve disposed above the discharge hole 156a and is discharged into the muffler space S4. The refrigerant discharged into the muffler space S4 flows into the high-pressure space S3 formed above the front head 156, passes through the air gap space G between the stator 131 and the rotor 132 of the motor 130, moves upward inside the casing 120, and is discharged from the discharge pipe 24.

In the same way, in the rear cylinder 153 the refrigerant is discharged from the compression chamber S2b to the muffler space S5. The refrigerant discharged from the rear cylinder 153 first flows into the muffler space S4. Then, the refrigerant is discharged from the discharge pipe 24 taking the same path as described above.

Here, the intermediate-pressure refrigerant is injected via the injection passages 151r, 153r into the compression chambers S1b. S2b in the middle of compression. Specifically, when pressure is higher in the injection passages 151r, 153r than in the compression chambers S1b, S2b, the intermediate-pressure refrigerant is injected from the injection passages 151r, 153r into the compression chambers Sib, S2b. When the pressure in the compression chambers S1b, S2b becomes higher and pressure becomes higher in the compression chambers S1b, S2b than in the injection passage 151r, the valve assemblies 280 provided in the injection passages 151r, 153r close and supply of the intermediate-pressure refrigerant is stopped. In this way, in the rotary compressor 200 pertaining to the present embodiment, compression efficiency is raised by injecting the intermediate-pressure refrigerant.

It will be noted that in the oil supply path 180, the refrigerating machine oil L is transferred utilizing the pressure difference between the compression chambers S1a, S1b in the front cylinder 151 and the oil reservoir 125 and the pressure difference between the compression chambers S2a, S2b in the rear cylinder 153 and the oil reservoir 125. Because of this, the refrigerating machine oil L in the oil reservoir SL is supplied via the oil supply path 180 to the rotary compression mechanism 150.

(11) Characteristics (11-1)

As described above, in the present embodiment, the rotary compressor 200 has the compression mechanism 150 that compresses low-pressure refrigerant in the compression chambers S1, S2 into high-pressure refrigerant, the injection pipes 90 for supplying intermediate-pressure refrigerant to the compression chambers S1, S2, and the valve assemblies 280 that are provided between the compression chambers S1, S2 and the injection pipes 90. Here, each valve assembly 280 has the opening forming member 281, the valve body 282, and the spring member 283. The opening forming member 281 forms the opening 281a. The valve body 282 moves in accordance with differences between the pressure of the refrigerant supplied from the injection pipes 90 and the pressure of the refrigerant in the middle of compression inside the compression chambers S1, S2 and blocks the opening 281a when the valve body 282 has moved from the compression chamber S1, S2 side to the injection pipe 90 side. The spring member 283 is provided on the injection pipe 90 side of the opening 281a and applies force in the direction of the injection pipe 90 to the valve body 282.

Consequently, in the rotary compressor 200 pertaining to the present embodiment, the valve assembly 280 uses the spring member 283 disposed on the injection pipe 90 side of the opening 281a to block the opening 281a, so the dead volume of the injection passage 151r between the opening 281a and the compression chambers S1, S2 can be reduced. Because of this, accumulation of the compressed refrigerant in the spaces between the open portion in the injection passage 151r and the compression chambers S1, S2 can be reduced. As a result, backflow of the compressed refrigerant to the low-pressure-side compression chambers (S1a, S2a) can be reduced, and the rotary compressor 200 whose compression efficiency is high can be provided.

(11-2)

Furthermore, each valve assembly 280 pertaining to the present embodiment further has, on the injection pipe 90 side of the opening 281a, the spring receiving member 284 (movable member) that is coupled to the valve body 282. Furthermore, the spring member 283 is a compression spring. Additionally, the spring receiving member 284 receives a compression spring load from the spring member 283. In this way, in the present embodiment, the valve assembly 280 in which the compression spring can be used to move the valve body can be provided.

(11-3)

Furthermore, in each valve assembly 280 pertaining to the present embodiment, the opening forming member 281 further has the open cylinder portion 281b that communicates with the opening 281a and inside of which the valve body 282 (the valve shaft portion 282b) is inserted. Additionally, the spring member 283 is disposed surrounding the periphery of the open cylinder portion 281b. Because of this, the spring member 283 is retained on the open cylinder portion 281b of the opening forming member 281, so the valve assembly 280 in which detachment of the spring member 283 is deterred and whose members are integrated can be provided.

(11-4)

Furthermore, in each valve assembly 280 pertaining to the present embodiment, the open cylinder portion (tubular portion) 281b of the opening forming member 281 has a contact portion that engages with the spring receiving member 284 (movable member) and regulates the movement of the spring receiving member 284. Here, the spring receiving member 284 is coupled to the valve shaft portion 282b. Consequently, a situation where the valve body 282 is moved more than necessary by the spring member 283 can be avoided. For example, a situation where the valve body 282 pops out into the compression chambers S1, S2 from the housing portions 151k, 153k can be avoided.

(11-5)

Furthermore, in each valve assembly 280 pertaining to the present embodiment, the spring receiving member 284 (movable member) has the flow path openings 284a. Because of this, the intermediate-pressure refrigerant flowing in from the injection pipes 90 can be supplied through the inside of the valve assembly 280 to the compression chambers S1, S2.

(11-6)

Furthermore, in the present embodiment, the front cylinder 151 and the rear cylinder 153 have the injection passages 151r, 153r, out of which the intermediate-pressure refrigerant flows to the compression chambers S1, S2, and the housing portions 151k, 153k, which house the valve assemblies 280. Additionally, the housing portions 151k, 153k house the valve assemblies 280 in such a way that the outflow direction d1 of the intermediate-pressure refrigerant that flows out of the openings 281a in the opening forming members 281 and the outflow direction d2 of the intermediate-pressure refrigerant that flows out from the injection passages 151r, 153r to the compression chambers S1, S2 are substantially horizontal.

With this rotary compressor 200, the intermediate-pressure refrigerant flows linearly from the injection pipes 90 to the compression chambers S1, S2, so the intermediate-pressure refrigerant can be supplied quickly when the openings 281a are open. Furthermore, in the above-described compression mechanism 150, the injection passages 151r, 153r can be provided by forming through holes in the radial direction of the front cylinder 151 and the rear cylinder 153. Additionally, the rotary compressor 200 having the above-described configuration can be manufactured by simply fitting the valve assemblies 280 into these through holes. Consequently, with this configuration, the rotary compressor 200 whose compression efficiency is high can be easily manufactured.

(12) Example Modifications

Example modifications of the present embodiment will be described below. It will be noted that each example modification may be appropriately combined with another example modification to the extent that they do not conflict with each other.

(12-1) Example Modification 2A

The rotary compressor 200 pertaining to the present embodiment used the valve assembly 280, but instead the rotary compressor 200 is not limited to this. For example, the rotary compressor 200 can also use, instead of the valve assembly 280, the valve assembly 80 having the shape used in the first embodiment and example modifications thereof.

(12-2) Example Modification 2B

In the rotary compressor 200 pertaining to the present embodiment, at least part of the valve body 282 may also project into the compression chambers S1, S2 from the cylinders 151, 153 when the valve body 282 is not blocking the opening 281a in the opening forming member 281.

Figure 26A:
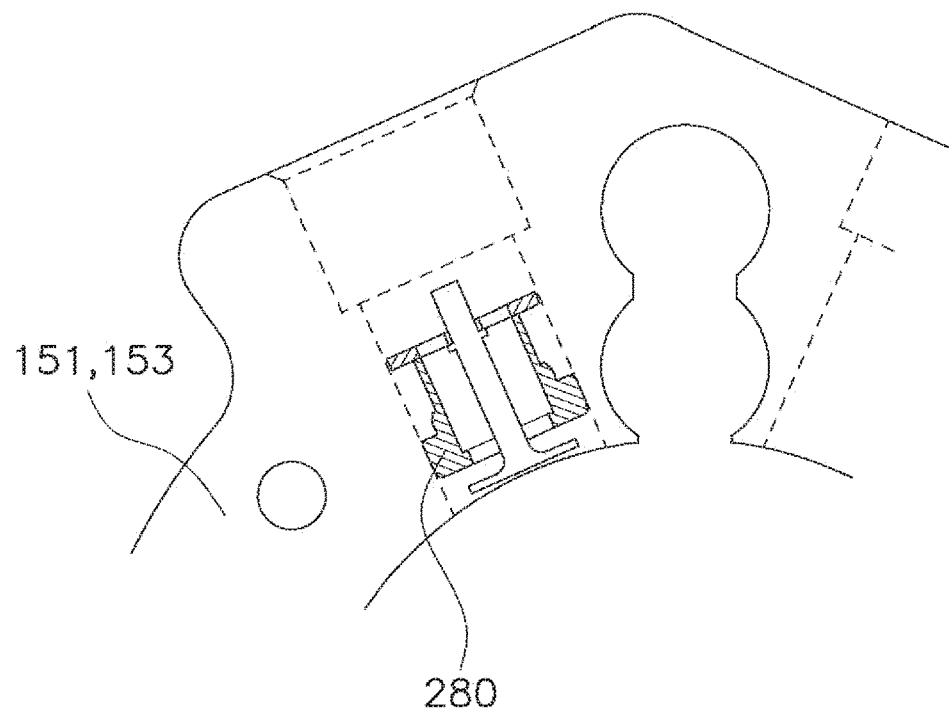
FIGS. 26A and 26B are schematic views for describing the housing position of the valve assembly 280 pertaining to the same embodiment.
Figure 26B:
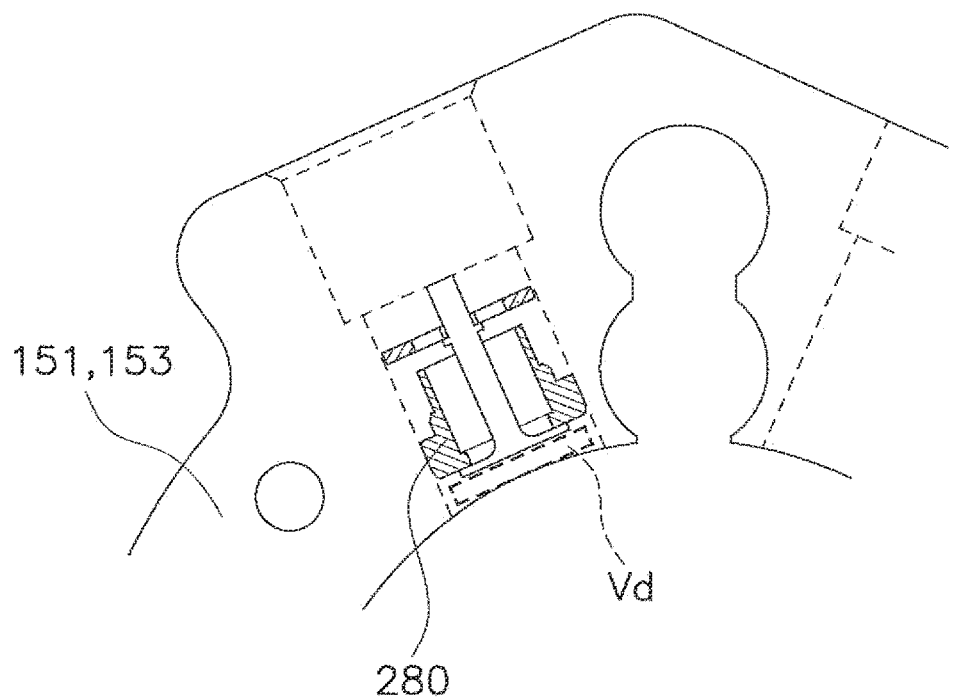
Figure 27:
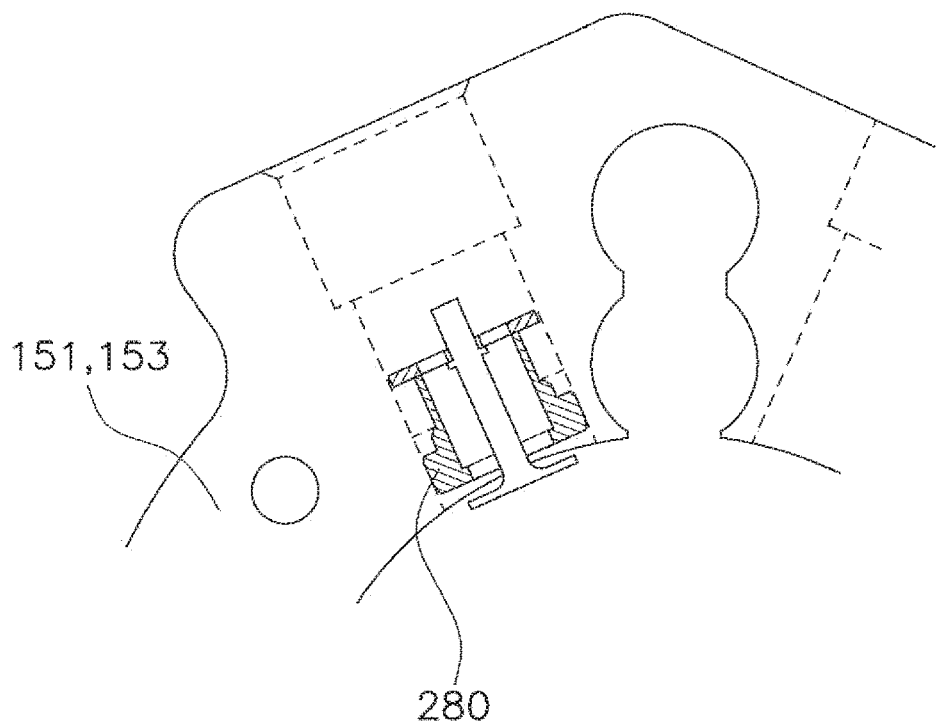
FIG. 27 is a schematic view for describing the housing position of a valve assembly 280 pertaining to example modification 2B.

In the rotary compressor 200 pertaining to the present embodiment, the pistons 152, 154 and the valve body 282 are configured to not hit each other. For that reason, usually, as shown in FIG. 26A, the rotary compressor 200 is configured so that even when the valve assembly 280 is open the valve body 282 fits inside the spaces of the housing portions 151k, 153k of the cylinders 151, 153. However, in a case where the valve assembly 280 is provided in the neighborhoods of the discharge holes 156a, 157a, even if the valve body 282 projects into the compression chambers S1, S2, the valve body 282 does not hit the pistons 152, 154 positioned in the neighborhoods of the suction holes 151a, 153a. Therefore, as shown in FIG. 27, it is also possible to employ a configuration where, when the valve body 282 is not blocking the opening 281a, at least part of the valve body 282 projects into the compression chambers S1, S2 from the housing portions 151k, 153k of the cylinders 151, 153. With this configuration, the dead volume Vd between the valve assembly 280 and the compression chamber shown in FIG. 26B can be further reduced. As a result, the compression efficiency of the rotary compressor 200 can be improved.

(12-3) Example Modification 2C

Figure 28:
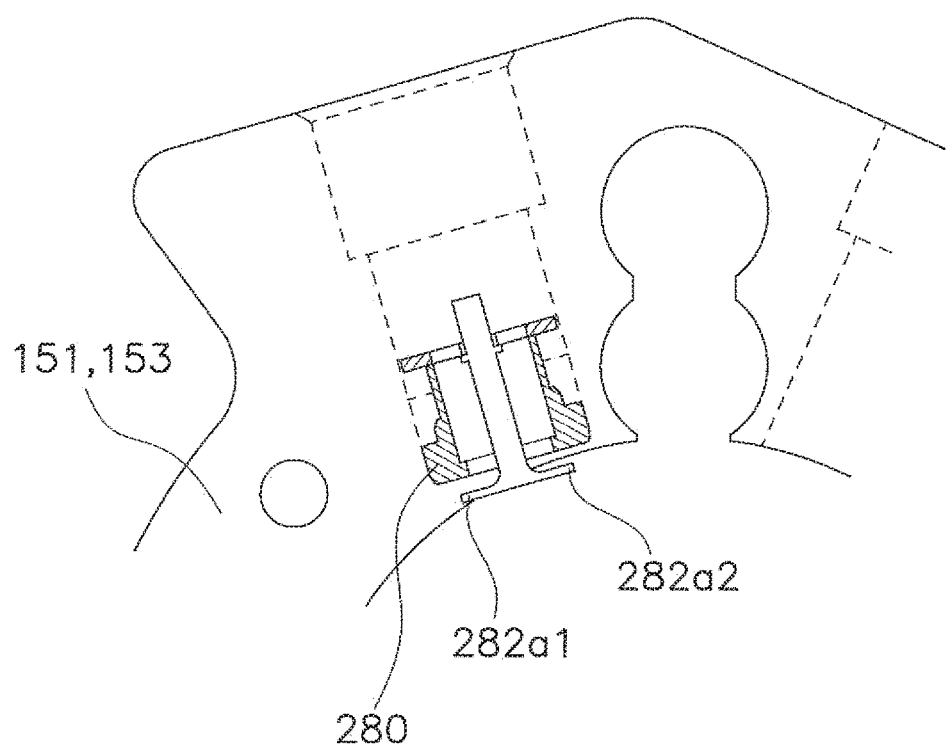
FIG. 28 is a schematic view for describing the housing position of a valve assembly 280 pertaining to example modification 2C.

In the rotary compressor 200 pertaining to example modification 2B, in a case where the valve body 282 does not move normally, sometimes the pistons 152, 154 and the valve body 282 hit each other. Therefore, as shown in FIG. 28, the rotary compressor 200 may also employ a configuration where the central portion of the flat plate portion 282a projects into the compression chambers S1. S2 but, of end portions 282a1, 282a2 of the flat plate portion 282a, the end portion 282a1 on the side opposing the rotational movement of the pistons 152, 154 does not project into the compression chambers S1, S2.

With this configuration, even if the valve body 282 is not housed normally inside the cylinders 151, 153, the pistons 152, 154 push the flat plate portion 282a smoothly into the cylinders 151, 154 along the inner peripheral surfaces of the cylinders 151, 153 by means of the rotation of the pistons 152, 154. Consequently, damage to the valve body 282 caused by the rotation of the pistons 152, 154 can be avoided. As a result, the rotary compressor 200 that is highly safe can be provided.

(12-4) Example Modification 2D

Figure 29:
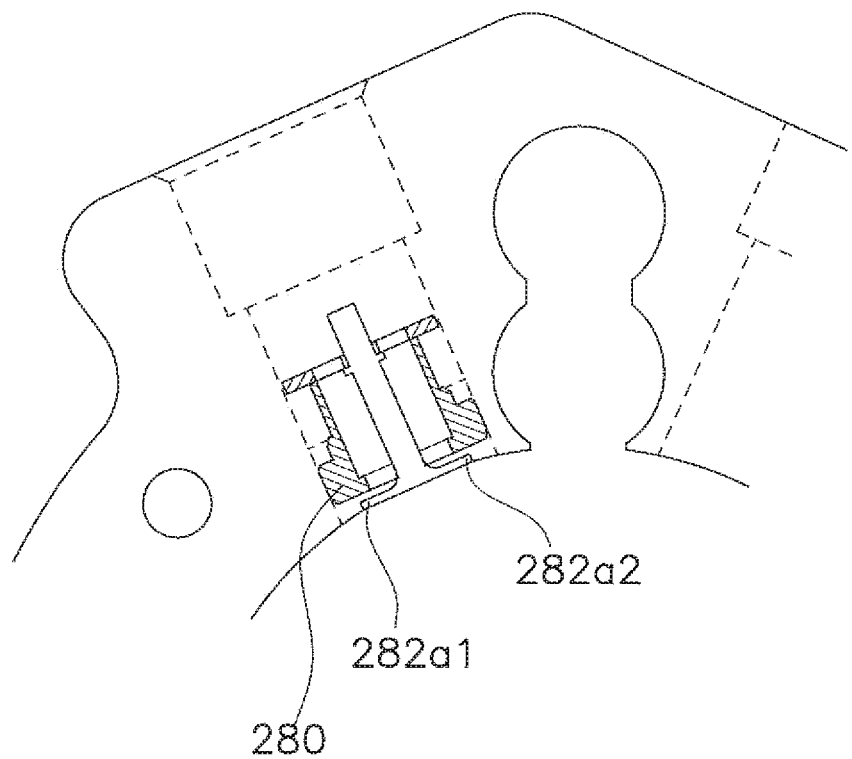
FIG. 29 is a schematic view for describing the housing position of a valve assembly 280 pertaining to example modification 2D.

The pistons 152, 154 sometimes reversely rotate when, for example, the motor 130 is stopped. Consequently, in the rotary compressor 200 pertaining to example modification 2C, sometimes the pistons 152, 154 and (the end portion 282a2 of) the valve body 282 hit each other when the pistons 152, 154 have reversely rotated. Therefore, as shown in FIG. 29, the rotary compressor 200 may also employ a configuration where the central portion of the flat plate portion 282a projects into the compression chambers S1, S2 but both end portions 282a1, 282a2 of the flat plate portion 282a do not project into the compression chambers S1, S2.

With this configuration, even when the pistons 152, 154 have reversely rotated, the pistons 152, 154 push the end portion 282a2 of the flat plate portion 282a smoothly into the cylinders 151, 153, so damage to the valve body 282 caused by the rotation of the pistons 152, 154 can be avoided.

Furthermore, the rotary compressor 200 pertaining to example modification 2C has a configuration where just one end (282a2) projects with respect to the inner peripheral surface, so when forming the injection passages 151r, 153r there arises the need to form through holes in a direction offset from the centers of the cylinders 151, 153. For that reason, difficulty in terms of manufacturing is big. In contrast, in example modification 2D, the injection passages 151r, 153r can be formed by forming through holes pointing toward the centers of the cylinders 151, 153. Consequently, with the rotary compressor 200 pertaining to example modification 2D, not only can the rotary compressor 200 run more safely than the rotary compressors pertaining to example modifications 2B and 2C, but the rotary compressor 200 can also be more easily manufactured.

(12-5) Example Modification 2E

In the above-described embodiment, the opening forming member 281 and each of the cylinders 151, 153 were formed by different members, but they may also be formed by the same member. By integrating the opening forming member 281 and the cylinders 151, 153, the number of parts can be reduced.

Addendum

It will be noted that the invention is not limited to the above-described embodiments. The invention can at the stage of implementation be embodied with constituent elements modified in a range that does not depart from the spirit thereof. Furthermore, various inventions can be formed by appropriately combining multiple constituent elements disclosed in the above-described embodiments. For example, several constituent elements may be omitted from all the constituent elements described in the embodiments. Moreover, constituent elements may also be appropriately combined in a different embodiment.

What is claimed is:

1. A rotary compressor comprising:
a compression mechanism including a compression chamber and configured to compress low-pressure refrigerant in the compression chamber into high pressure refrigerant;
an injection pipe arranged to supply intermediate-pressure refrigerant to the compression chamber; and
a valve assembly arranged between the compression chamber and the injection pipe,
the valve assembly having
an opening forming member that forms an opening;
a valve body that
moves in accordance with a difference between
a first pressure of the refrigerant supplied from the injection pipe and
a second pressure of the refrigerant in the middle of compression in the compression chamber; and
a spring member disposed on the injection pipe side of the opening, the spring member applying a force against the valve body in a direction of the injection pipe,
the valve body moving from an injection pipe side to a compression chamber side so as to open the opening and inject the refrigerant from the injection pipe into the compression chamber when the first pressure is higher than the second pressure,
the valve body moving from the compression chamber side to the injection pipe side so as to block the opening when the first pressure is lower than the second pressure, a dead volume existing between the valve body and the compression chamber when the valve body is blocking the opening, and
a diameter of the dead volume is smaller than a diameter of a flow path where the opening forming member is disposed.

2. The rotary compressor according to claim 1, further comprising:
a movable member coupled to the valve body, on the injection pipe side of the opening,
the spring member being a compression spring, and
the movable member receiving a compression spring load from the spring member.

3. The rotary compressor according to claim 2, wherein the opening forming member further has a retention portion that surrounds and retains a periphery of the spring member.

4. The rotary compressor according to claim 3, wherein the retention portion has a contact portion that contacts the movable member, and the contact portion regulates movement of the movable member.

5. The rotary compressor according to claim 2, wherein the opening forming member further has a tubular portion that communicates with the opening, and the valve body is inserted inside of the tubular portion, and
the spring member is disposed surrounding a periphery of the tubular portion.

6. The rotary compressor according to claim 5, wherein the tubular portion has a contact portion that contacts the movable member, and the contact portion regulates movement of the movable member.

7. The rotary compressor according to claim 6, wherein the contact portion is disposed on the injection pipe side of the opening in the opening forming member.

8. The rotary compressor according to claim 2, wherein the movable member has flow path openings.

9. The rotary compressor according to claim 1, wherein the spring member is an extension spring coupled to the valve body from the injection pipe side of the opening.

10. The rotary compressor according to claim 1, wherein the compression mechanism has
an injection passage out of which the intermediate-pressure refrigerant flows to the compression chamber and
a housing portion that houses the valve assembly and defines the flow path where the opening forming member is disposed, and
the housing portion houses the valve assembly in such a way that an outflow direction of the intermediate-pressure refrigerant that flows out of the opening and an outflow direction of the intermediate-pressure refrigerant that flows out from the injection passage to the compression chamber are horizontal.

11. The rotary compressor according to claim 1, wherein the compression mechanism has
an injection passage out of which the intermediate-pressure refrigerant flows to the compression chamber and
a housing portion that houses the valve assembly and defines the flow path where the opening forming member is disposed, and
the housing portion houses the valve assembly in such a way that an outflow direction of the intermediate-pressure refrigerant that flows out of the opening and an outflow direction of the intermediate-pressure refrigerant that flows out from the injection passage to the compression chamber are perpendicular.

12. The rotary compressor according to claim 1, wherein the compression mechanism has
a cylinder, and
a piston that forms the compression chamber between the piston and an inner peripheral surface of the cylinder, and the piston eccentrically rotates along the inner peripheral surface of the cylinder,
the opening forming member is housed in the cylinder or is a member integrated with the cylinder, and
at least part of the valve body projects into the compression chamber from the cylinder when the valve body is not blocking the opening.

13. The rotary compressor according to claim 12, wherein the valve body has, on the compression chamber side of the opening in the opening forming member, a flat plate-shaped flat plate portion,
when the valve body is not blocking the opening, a central portion of the flat plate portion projects into the compression chamber and an end portion of the flat plate portion on a side opposing the rotational movement of the piston does not project into the compression chamber.

14. The rotary compressor according to claim 12, wherein the valve body has, on the compression chamber side of the opening in the opening forming member, a flat plate-shaped flat plate portion, when the valve body is not blocking the opening, a central portion of the flat plate portion projects into the compression chamber and both end portions of the flat plate portion do not project into the compression chamber.

15. The rotary compressor according to claim 1, further comprising:
an injection passage disposed between the compression chamber and the injection pipe; and
a housing portion that houses the valve assembly and defines the flow path where the opening forming member is disposed, the housing portion being disposed between the injection passage and the compression chamber.

16. The rotary compressor according to claim 1, wherein the flow path where the opening forming member is disposed has a shoulder portion against which the opening forming member abuts, the shoulder portion defining the diameter of the dead volume.

17. A compressor comprising:
a compression mechanism including a compression chamber and configured to compress low-pressure refrigerant in the compression chamber into high pressure refrigerant;
an injection pipe arranged to supply intermediate-pressure refrigerant to the compression chamber; and
a valve assembly arranged between the compression chamber and the injection pipe,
the valve assembly having
an opening forming member that forms an opening;
a valve body that
moves in accordance with a difference between
a first pressure of the refrigerant supplied from the injection pipe and
a second pressure of the refrigerant in the middle of compression in the compression chamber; and
a spring member disposed on the injection pipe side of the opening, the spring member applying a force against the valve body in a direction of the injection pipe,
the valve body moving from an injection pipe side to a compression chamber side so as to open the opening and inject the refrigerant from the injection pipe into the compression chamber when the first pressure is higher than the second pressure, and
the valve body moving from the compression chamber side to the injection pipe side so as to block the opening when the first pressure is lower than the second pressure, a dead volume existing between the valve body and the compression chamber when the valve body is blocking the opening, wherein
the valve body has a flat plate-shaped portion disposed on the compression chamber side of the opening in the opening forming member,
when the valve body is not blocking the opening, a central portion of the flat plate portion projects into the compression chamber and an end portion of the flat plate portion on one side of the opening does not project into the compression chamber.

18. A compressor comprising:
a compression mechanism including a compression chamber and configured to compress low-pressure refrigerant in the compression chamber into high pressure refrigerant;
an injection pipe arranged to supply intermediate-pressure refrigerant to the compression chamber; and
a valve assembly arranged between the compression chamber and the injection pipe,
the valve assembly having
an opening forming member that forms an opening;
a valve body that
moves in accordance with a difference between
a first pressure of the refrigerant supplied from the injection pipe and
a second pressure of the refrigerant in the middle of compression in the compression chamber; and
a spring member disposed on the injection pipe side of the opening, the spring member applying a force against the valve body in a direction of the injection pipe,
the valve body moving from an injection pipe side to a compression chamber side so as to open the opening and inject the refrigerant from the injection pipe into the compression chamber when the first pressure is higher than the second pressure, and
the valve body moving from the compression chamber side to the injection pipe side so as to block the opening when the first pressure is lower than the second pressure, a dead volume existing between the valve body and the compression chamber when the valve body is blocking the opening, wherein
the valve body has a flat plate-shaped portion disposed on the compression chamber side of the opening in the opening forming member,
when the valve body is not blocking the opening, a central portion of the flat plate portion projects into the compression chamber and both end portions of the flat plate portion do not project into the compression chamber.

* * * * *